US011082660B2

(12) United States Patent
Miki et al.

(10) Patent No.: US 11,082,660 B2
(45) Date of Patent: Aug. 3, 2021

(54) INFORMATION PROCESSING DEVICE AND INFORMATION PROCESSING METHOD

(71) Applicant: SONY CORPORATION, Tokyo (JP)

(72) Inventors: Daisuke Miki, Tokyo (JP); Atsushi Izumihara, Kanagawa (JP); Yusuke Sakai, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 181 days.

(21) Appl. No.: 16/315,398

(22) PCT Filed: Apr. 25, 2017

(86) PCT No.: PCT/JP2017/016435
§ 371 (c)(1),
(2) Date: Jan. 4, 2019

(87) PCT Pub. No.: WO2018/025458
PCT Pub. Date: Feb. 8, 2018

(65) Prior Publication Data
US 2019/0313055 A1     Oct. 10, 2019

(30) Foreign Application Priority Data

Aug. 1, 2016  (JP) .............................. JP2016-151268

(51) Int. Cl.
*H04N 7/14*      (2006.01)
*G06T 7/70*      (2017.01)
(Continued)

(52) U.S. Cl.
CPC ............ *H04N 7/147* (2013.01); *G01B 11/25* (2013.01); *G06T 7/0002* (2013.01); *G06T 7/70* (2017.01)

(58) Field of Classification Search
CPC .......... H04N 7/147; H04N 7/15; H04N 7/142; H04N 7/141; H04N 5/23293;
(Continued)

(56) References Cited

U.S. PATENT DOCUMENTS 8,154,578 B2 *  4/2012  Kurtz ................. G06K 9/00335
                                                        348/14.01
8,570,402 B2 * 10/2013  Kitaya ...................... G06T 1/00
                                                        348/239
(Continued)

FOREIGN PATENT DOCUMENTS

CN        102411783 A      4/2012
CN        102474593 A      5/2012
(Continued)

OTHER PUBLICATIONS

Extended European Search Report of EP Application No. 17836565.6, dated Jul. 12, 2019, 09 pages.
(Continued)

*Primary Examiner* — Michael S Osinski
(74) *Attorney, Agent, or Firm* — Chip Law Group

(57) ABSTRACT

There is provided an information processing device and an information processing method capable of giving a sense of realism as if a partner connected in video communication is present in one's sight. The information processing device including a communication unit configured to transmit and receive an image to and from a communication connection destination. Further, a control unit is configured to control a display range and a position of the image, on the basis of a display size and installation position information of a display device that displays the image and distance information of a subject appearing in the image that is acquired from the image.

11 Claims, 26 Drawing Sheets

(51) Int. Cl.
*G01B 11/25* (2006.01)
*G06T 7/00* (2017.01)

(58) Field of Classification Search
CPC ........... H04N 5/23296; H04N 5/23218; H04N 5/23219; H04N 21/44008; G06T 7/0002; G06T 7/70; G06T 3/40; G01B 11/25; G06K 9/00228; G06K 9/00362; G06K 9/00255; G06K 9/00369
See application file for complete search history.

(56) References Cited

U.S. PATENT DOCUMENTS

| | | | | |
|---|---|---|---|---|
| 8,896,655 | B2* | 11/2014 | Mauchly | H04N 7/15 348/14.06 |
| 9,426,379 | B2* | 8/2016 | Nonaka | H04N 5/23203 |
| 9,485,459 | B2* | 11/2016 | Shoemake | H04N 7/141 |
| 9,875,521 | B2* | 1/2018 | Kondo | H04N 21/4312 |
| 10,469,767 | B2* | 11/2019 | Shikata | H04N 5/247 |
| 2008/0266326 | A1* | 10/2008 | Porwal | G06F 3/012 345/659 |
| 2008/0297587 | A1* | 12/2008 | Kurtz | H04N 7/15 348/14.08 |
| 2009/0096910 | A1* | 4/2009 | Yasuda | H04N 5/23293 348/333.01 |
| 2010/0214319 | A1* | 8/2010 | Nakano | G06F 16/583 345/652 |
| 2010/0284568 | A1* | 11/2010 | Tojo | G06K 9/00255 382/103 |
| 2011/0096137 | A1 | 4/2011 | Baker et al. | |
| 2012/0081500 | A1* | 4/2012 | Border | H04N 5/23254 348/14.02 |
| 2012/0127261 | A1 | 5/2012 | Okada | |
| 2014/0078372 | A1* | 3/2014 | Yamashita | G06K 9/00228 348/333.02 |
| 2014/0119600 | A1* | 5/2014 | Maruyama | H04N 13/373 382/103 |
| 2014/0132845 | A1* | 5/2014 | Okaniwa | H04N 9/3185 348/745 |
| 2014/0146086 | A1* | 5/2014 | Kondo | G06T 3/40 345/660 |
| 2014/0160226 | A1* | 6/2014 | Hirano | H04M 3/567 348/14.08 |
| 2014/0313277 | A1* | 10/2014 | Yarosh | H04N 7/144 348/14.08 |
| 2014/0375752 | A1* | 12/2014 | Shoemake | H04N 21/42203 348/14.07 |
| 2015/0062305 | A1* | 3/2015 | Murayama | G01B 11/043 348/48 |
| 2015/0332090 | A1* | 11/2015 | Kumamoto | G06K 9/036 348/222.1 |
| 2016/0150215 | A1* | 5/2016 | Chen | H04N 5/23293 348/47 |
| 2016/0198100 | A1* | 7/2016 | Cho | G06F 3/0487 348/222.1 |
| 2016/0240009 | A1* | 8/2016 | Lyren | G02B 27/017 |
| 2016/0328201 | A1* | 11/2016 | Ito | H04N 5/2624 |
| 2016/0330406 | A1* | 11/2016 | Muramatsu | H04N 7/147 |
| 2017/0019627 | A1* | 1/2017 | Wan | G06T 7/285 |
| 2017/0104915 | A1* | 4/2017 | Adachi | G06K 9/3233 |
| 2017/0155831 | A1* | 6/2017 | Jang | H04N 5/23219 |
| 2017/0193970 | A1 | 7/2017 | Takahashi et al. | |
| 2017/0235975 | A1* | 8/2017 | Iwanami | G06F 21/6245 726/28 |
| 2017/0236298 | A1* | 8/2017 | Vetter | H04N 5/23222 348/77 |
| 2017/0310928 | A1* | 10/2017 | Nakano | H04L 65/1059 |
| 2018/0045504 | A1* | 2/2018 | Jiang | G06T 7/62 |

FOREIGN PATENT DOCUMENTS

| | | |
|---|---|---|
| CN | 103051859 A | 4/2013 |
| CN | 103081462 A | 5/2013 |
| JP | 2008-005122 A | 1/2008 |
| JP | 2011-023886 A | 2/2011 |
| JP | 2011-059528 A | 3/2011 |
| JP | 2011-113206 A | 6/2011 |
| JP | 2015-075877 A | 4/2015 |
| WO | 2010/070820 A1 | 6/2010 |
| WO | 2011/007489 A | 1/2011 |
| WO | 2015/194075 A1 | 12/2015 |

OTHER PUBLICATIONS

International Search Report and Written Opinion of PCT Application No. PCT/JP2017/016435, dated Aug. 8, 2017, 09 pages of ISRWO.

Office Action for CN Patent Application No. 201780044902.7, dated Apr. 29, 2020, 8 pages of Office Action and 9 pages of English Translation.

* cited by examiner

FIG. 22
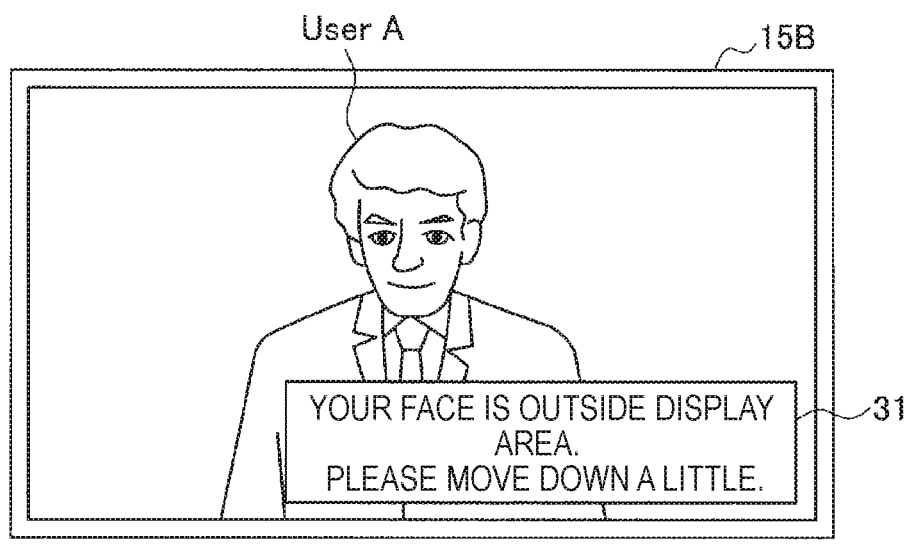
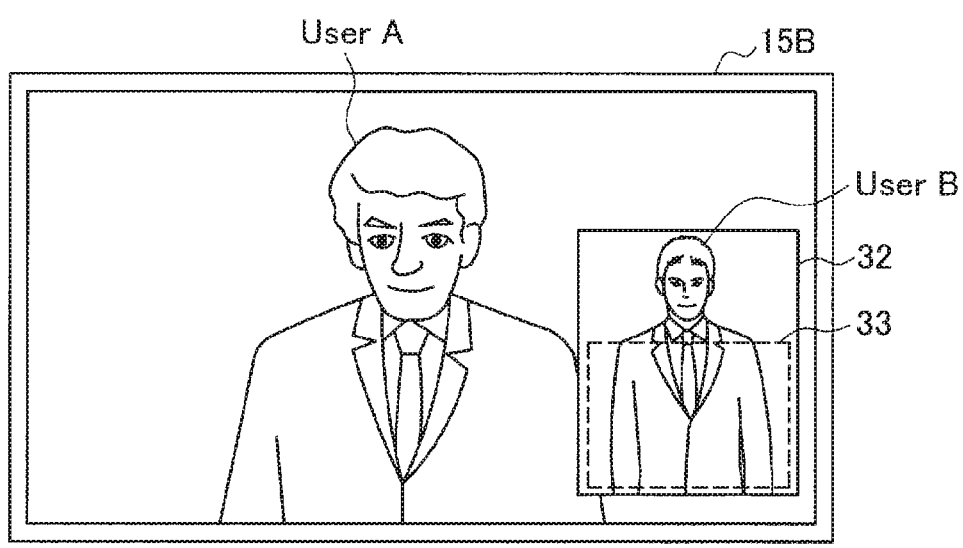

FIG. 23
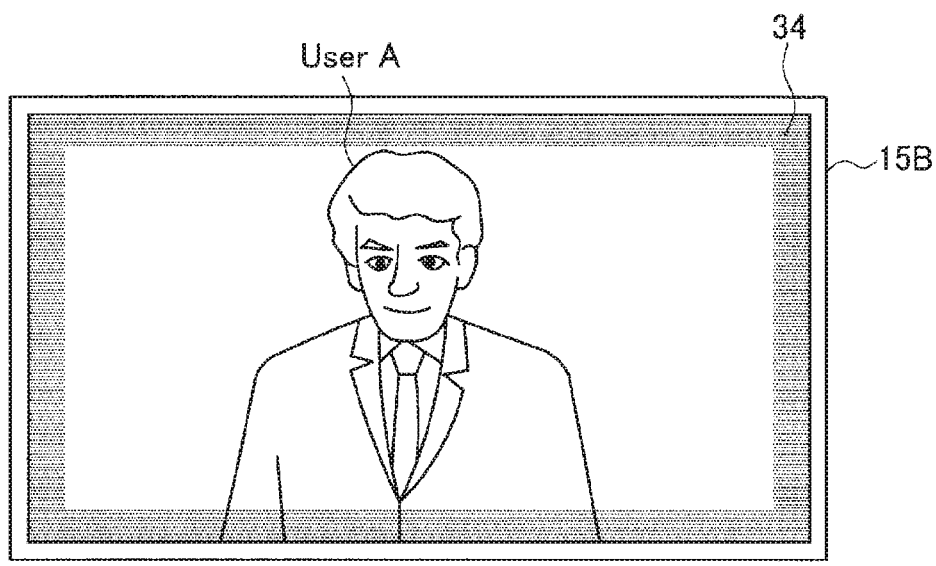
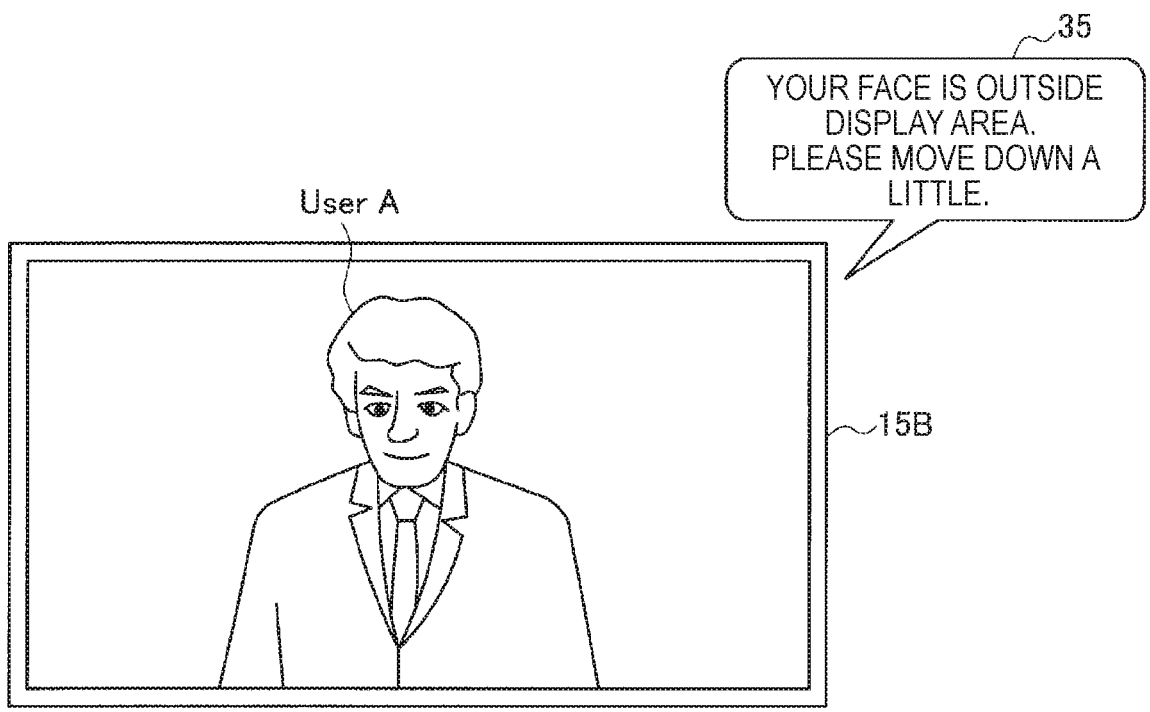

INFORMATION PROCESSING DEVICE AND INFORMATION PROCESSING METHOD

CROSS REFERENCE TO RELATED APPLICATIONS

This application is a U.S. National Phase of International Patent Application No. PCT/JP2017/016435 filed on Apr. 25, 2017, which claims priority benefit of Japanese Patent Application No. JP 2016-151268 filed in the Japan Patent Office on Aug. 1, 2016. Each of the above-referenced applications is hereby incorporated herein by reference in its entirety.

TECHNICAL FIELD

The present disclosure relates to an information processing device, an information processing method, and a program.

BACKGROUND ART

In recent years, as communication technologies have developed, TV phone systems for having a conversation while looking at video of a partner at remote locations have been proposed. Specifically, for example, a display device, a camera, a microphone, and a speaker are provided in each place, and captured video and collected audio data in one place are output in real time from a display device and a speaker installed in the other place. Each user is located in front of the camera, and makes a conversation while looking at a figure of the partner appearing in the display device.

In addition, in regard to guiding a user's position with respect to a large-screen TV, for example, Patent Literature 1 below describes a method of guiding the user to an appropriate viewing position by performing facial recognition in order to prevent the user from viewing a TV screen at a position inappropriate for viewing by, for example, approaching the TV screen.

CITATION LIST

Patent Literature

Patent Literature 1: JP 2011-59528A

DISCLOSURE OF INVENTION

Technical Problem

However, even if it is possible to make a conversation while looking at a figure of a partner in video communication, a sense of realism as if the partner is in one's sight cannot be obtained.

Hence, the present disclosure proposes an information processing device, an information processing method, and a program capable of giving a sense of realism as if a partner connected in video communication is present in one's sight.

Solution to Problem

According to the present disclosure, there is proposed an information processing device including: a communication unit configured to transmit and receive an image to and from a communication connection destination; and a control unit configured to control a display range and a position of the image, on the basis of a display size and installation position information of a display device that displays the image, and distance information of a subject appearing in the image that is acquired from the image.

According to the present disclosure, there is proposed an information processing method including, by a processor: transmitting and receiving an image to and from a communication connection destination; and controlling a display range and a position of the image, on the basis of a display size and installation position information of a display device that displays the image, and distance information of a subject appearing in the image that is acquired from the image.

According to the present disclosure, there is proposed a program causing a computer to function as: a communication unit configured to transmit and receive an image to and from a communication connection destination; and a control unit configured to control a display range and a position of the image, on the basis of a display size and installation position information of a display device that displays the image, and distance information of a subject appearing in the image that is acquired from the image.

Advantageous Effects of Invention

According to the present disclosure as described above, a sense of realism as if a partner connected in video communication is present in one's sight can be given.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 22 is a diagram for describing an example of guiding of an imaging side according to the present embodiment.

FIG. 23 is a diagram for describing an example of guiding of an imaging side according to the present embodiment.

MODE(S) FOR CARRYING OUT THE INVENTION

Figure 1:
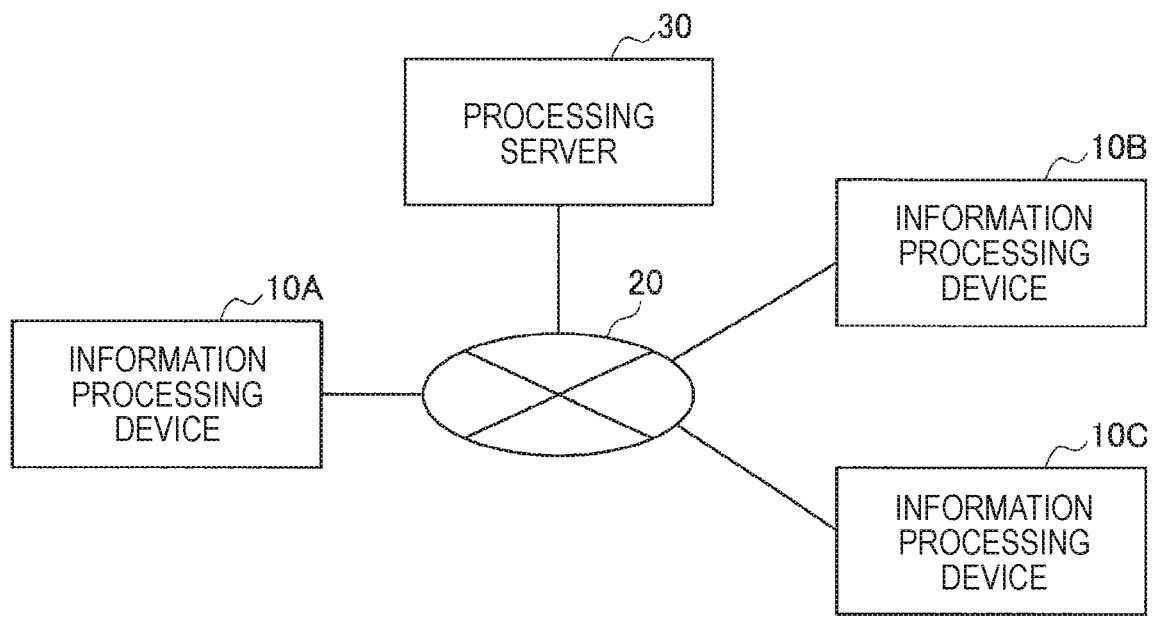
FIG. 1 illustrates an overall configuration of a communication system according to an embodiment of the present disclosure.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

In addition, description will be given in the following order.
1. Overview of communication system according to embodiment of present disclosure
2. Configuration
3. Operation processing
4. Other examples
5. Hardware configuration
6. Conclusion 1. Overview of Communication System According to Embodiment of Present Disclosure An overview of a communication system 1 according to an embodiment of the present disclosure is described with reference to FIG. 1. FIG. 1 illustrates an overall configuration of the communication system 1 according to an embodiment of the present disclosure.

As illustrated in FIG. 1, information processing devices 10A, 10B, and 10C are connected via a network 20. The information processing devices 10A, 10B, and 10C are disposed respectively in space A, space B, and space C, and the spaces are connected by an information channel of video, sound, and the like, which makes it possible to feel as if the spaces are connected. For example, when a parent and a child live away from each other, their living spaces can be made to look connected to each other via a display device corresponding to a window or a door. In the case where living spaces are connected to each other, a user can live while roughly grasping a situation of a partner space (e.g., a situation of a child, a situation of a parent, or the like).

The information processing devices 10A to 10C perform synchronization processing of two-way communication, calculation and control of spatial distance, etc.; the calculation and control of separation distance, etc. may be performed by a processing server 30. In addition, the communication system 1 includes the processing server 30 in the example illustrated in FIG. 1, but the present disclosure is not limited to this, and the processing server 30 does not need to be included.

BACKGROUND

Here, as described above, even if it is possible to make a conversation while looking at a figure of a partner in video communication, it is difficult to give a sense of realism as if the partner is in one's sight. To address this, it may be possible to express a sense of distance to a partner by controlling a display size, because the partner displayed small feels far, and the partner displayed large feels close, for example.

Figure 2:
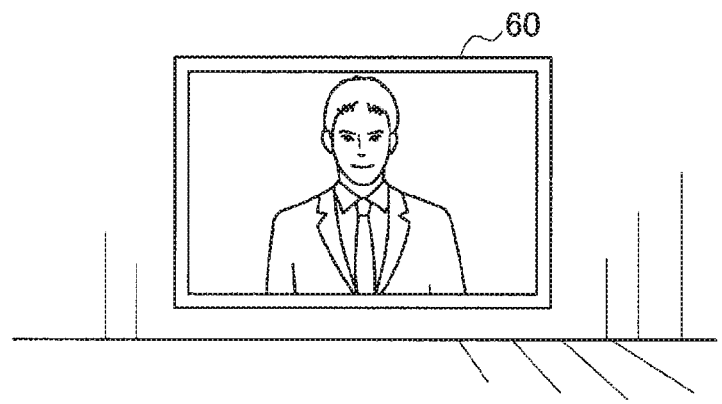
FIG. 2 is a diagram for describing conventional problems.

However, such a method is based on the premise that a person is confronting a camera, and a position of a display is not prescribed; hence, for example, in the case where a display 60 is disposed near the ground as illustrated in FIG. 2, a partner displayed large looks as if being in one's sight because a sense of distance becomes closer, but looks as if the partner is buried in the ground; thus, a very unnatural state occurs.

Hence, in the present embodiment, a display range of partner video is decided appropriately in accordance with a physical size and an installation position of a display; thus, a sense of realism as if a partner connected in video communication is present in one's sight can be given.

Figure 3:
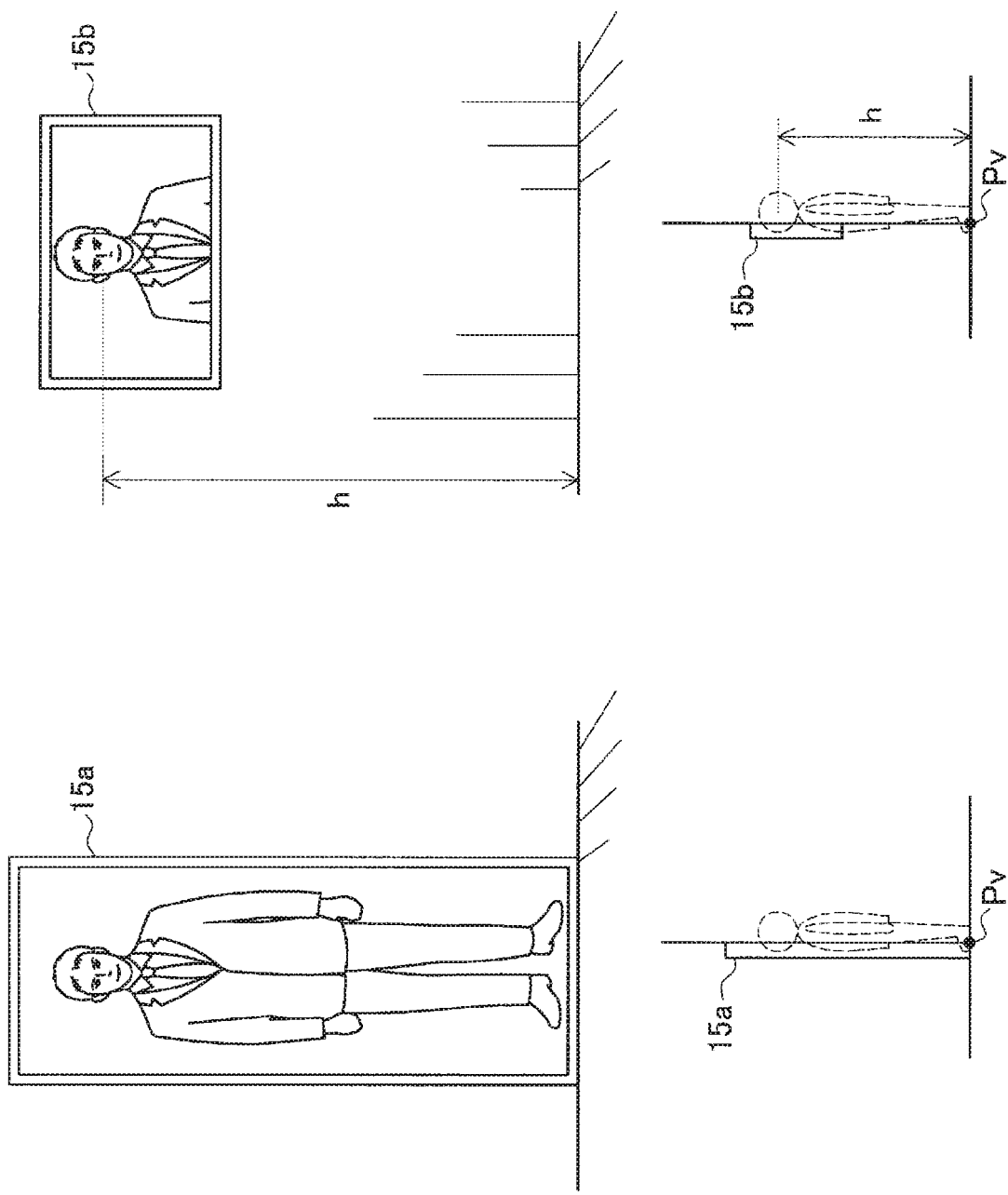
FIG. 3 is a diagram for describing a display example of partner video according to an embodiment of the present disclosure.

For example, in displaying video in which the whole body of a communication partner is seen, video of the communication partner is displayed in respective appropriate ranges in accordance with physical sizes and installation positions of displays 15a and 15b installed on walls as illustrated in FIG. 3. The information processing device 10 performs control in a manner that the partner's face is located at an appropriate height from the ground, assuming that a position where the display 15 is installed is a virtual standing position Pv. The display 15a illustrated on the left side of FIG. 3 has a lower side touching the ground; hence, a sense of realism can be given without unnaturalness even if the whole body of the communication partner is displayed.

On the other hand, the display 15b illustrated on the right side of FIG. 3 is installed at a position away from the ground; hence, displaying video of the whole body of the communication partner as it is results in a state where the communication partner is floating in air, makes life-size display impossible, and gives no sense of realism. Hence, the information processing device 10 controls a display range in a manner that the communication partner's face is disposed at an appropriate height h in the case of assuming that the communication partner has stood at the virtual standing position Pv, thereby making it possible to give a sense of realism as if the communication partner is present in one's sight.

In this manner, in the present embodiment, a life-size subject person can be displayed at an optimum position, without using distance information of the subject person measured with a special distance detector; thus, a sense of presence as if a connection partner is present there can be given.

The communication system 1 according to an embodiment of the present disclosure has been described. Now, a configuration of the information processing device 10 included in the communication system 1 and operation processing of the communication system 1 will be described in detail with reference to drawings.

2. Configuration of Information Processing Device

Figure 4:
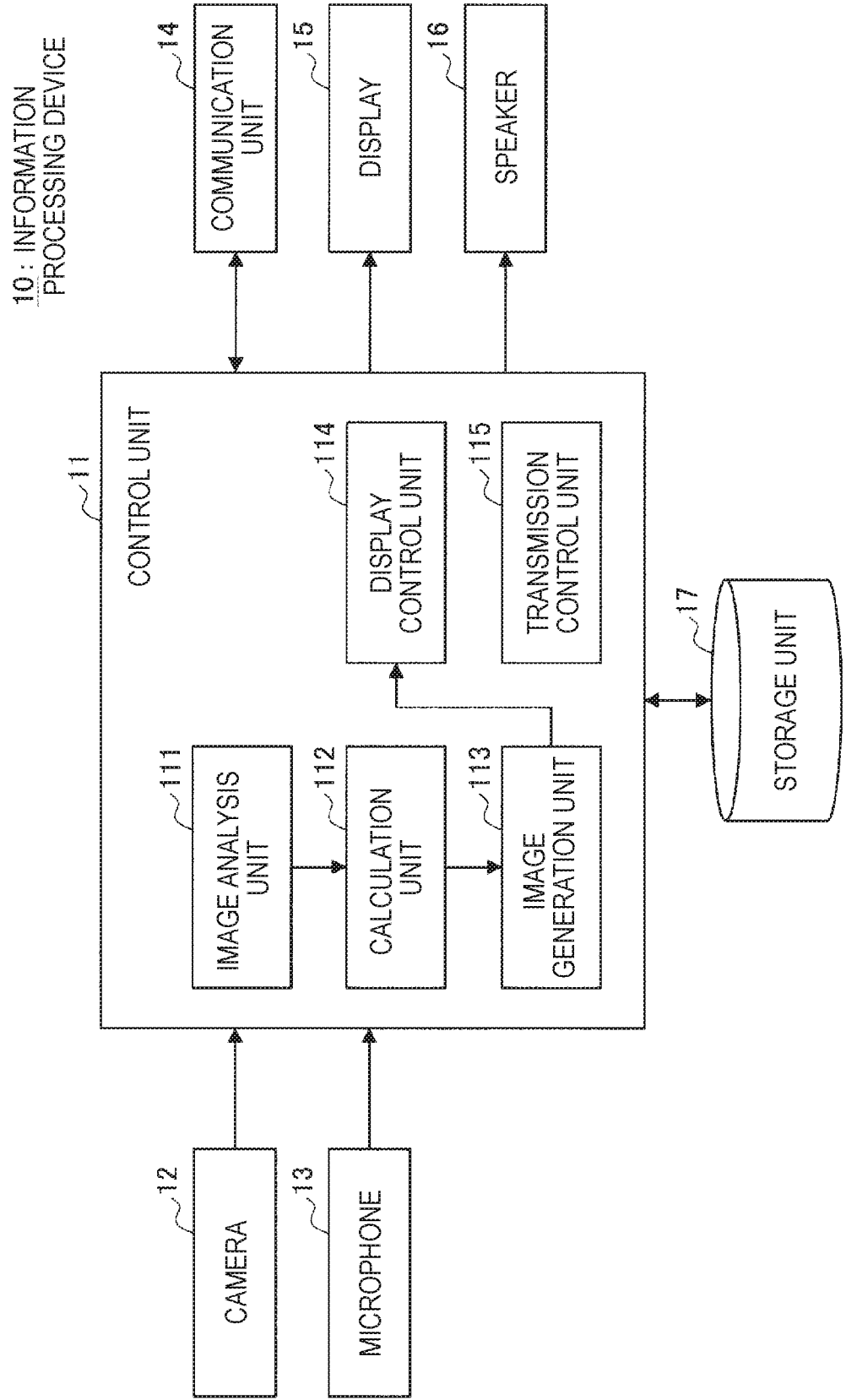
FIG. 4 is a block diagram illustrating an example of a configuration of an information processing device according to the present embodiment.

FIG. 4 is a block diagram illustrating an example of a configuration of the information processing device 10 according to the present embodiment. As illustrated in FIG. 4, the information processing device 10 includes a control unit 11, a camera 12, a microphone 13, a communication unit 14, a display 15, a speaker 16, and a storage unit 17.

The control unit 11 functions as an arithmetic processing device and a control device, and controls the overall operation of the information processing device 10 in accordance with a variety of programs. The control unit 11 is implemented, for example, by an electronic circuit such as a central processing unit (CPU) and a microprocessor. In addition, the control unit 11 may include a read only memory (ROM) that stores a program, an operation parameter and the like to be used, and a random access memory (RAM) that temporarily stores a parameter and the like varying as appropriate.

In addition, the information processing device 10 according to the present embodiment also functions as an image analysis unit 111, a calculation unit 112, an image generation unit 113, a display control unit 114, and a transmission control unit 115.

The image analysis unit 111 analyzes video of a connection destination space received via the communication unit 14. For example, the image analysis unit 111 performs object recognition, face detection, facial recognition, or the like.

The calculation unit 112 acquires various distance information of the communication partner appearing in video of the connection destination space, on the basis of an analysis result by the image analysis unit 111. Calculation of distance information will be described in detail with reference to FIGS. 9 to 18.

The image generation unit 113 decides an appropriate range to perform life-size display on the display 15, on the basis of various distance information of the communication partner calculated by the calculation unit 112, information of a camera installed in the connection destination space (including specs of the camera and installation position information of the camera), and a physical size and an installation position (a height from the ground, or the like) of the display 15, and performs clipping, enlargement, reduction, or the like of the range.

The display control unit 114 controls image display from the display 15. For example, the display control unit 114 performs control to display, at an appropriate position, an image that is output from the image generation unit 113 and obtained by clipping an appropriate range. For example, the display control unit 114 adjusts a display position of a center position of the face in a manner that a person appearing in the image looks as if actually standing there, assuming that a position where the display 15 is installed is a virtual standing position, and performs life-size display.

The transmission control unit 115 performs control to transmit, from the communication unit 14 to another information processing device 10 installed in the connection destination space, a captured image of a space where the information processing device 10 is installed captured by the camera 12 and an audio signal of the space collected by the microphone 13.

The camera 12 includes a lens system including an imaging lens, a diaphragm, a zoom lens, a focus lens, and the like, a drive system that causes the lens system to perform focus operation and zoom operation, a solid-state image sensor array that generates an imaging signal by photoelectrically converting imaging light obtained by the lens system, and the like. The solid-state image sensor array may be implemented by, for example, a charge coupled device (CCD) sensor array or a complementary metal oxide semiconductor (CMOS) sensor array. In addition, the camera 12 according to the present embodiment images the inside of a space, and acquires a captured image.

The microphone 13 collects sound in a space and environmental sound around the space (e.g., in a neighboring room, a hall, the outside of a house, etc.), and acquires audio data.

The communication unit 14 is a communication module for transmitting and receiving data to and from another device in a wired/wireless manner. The communication unit 14 wirelessly communicates with an external device directly or via a network access point in a scheme, for example, a wired local area network (LAN), a wireless LAN, Wireless Fidelity (Wi-Fi) (registered trademark), infrared communication, Bluetooth (registered trademark), short-range/contactless communication, and the like. The communication unit 14 according to the present embodiment connects to another information processing device 10 or the processing server 30 via the network 20, and transmits and receives data.

The display 15 is a display device that displays video of a connection destination space received via the communication unit 14. The display 15 may be, for example, a liquid crystal display (LCD), an organic electroluminescence (EL) display, or the like.

The speaker 16 is an output device that outputs audio data. For example, the speaker 16 outputs sound of a connection destination space received via the communication unit 14.

The storage unit 17 stores programs and parameters for the control unit 11 described above to execute functions. In addition, the storage unit 17 includes a storage device including a storage medium, a recording device for recording data on the storage medium, a reader device for reading out data from the storage medium, a deletion device for deleting data recorded on the storage medium, and the like. Note that the storage unit 17 may be, for example, a storage medium, such as a nonvolatile memory such as flash ROM (or flash memory), electrically erasable programmable read-only memory (EEPROM), and erasable programmable ROM (EPROM), a magnetic disk such as a hard disk and a disk-type magnetic disk, an optical disc such as a compact disc (CD), a digital versatile disc recordable (DVD-R), and a Blu-Ray disc (BD; registered trademark), and a magneto optical (MO) disk.

3. Operation Processing

Figure 5:
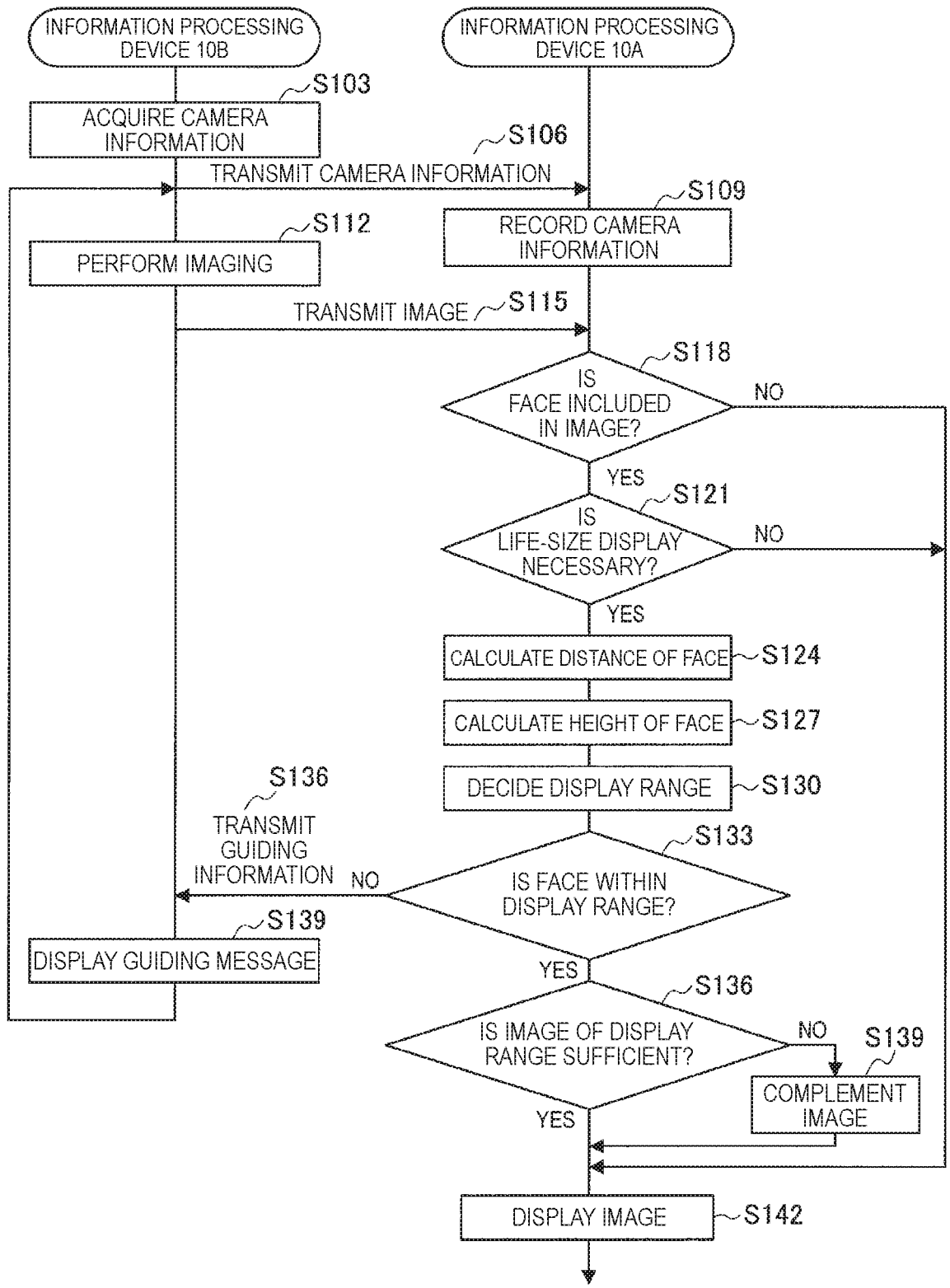
FIG. 5 is a flowchart illustrating operation processing of a communication system according to the present embodiment.

Now, operation processing of the communication system 1 according to the present embodiment will be described with reference to FIG. 5. FIG. 5 is a flowchart illustrating operation processing of the communication system 1 according to the present embodiment. Here, as an example, description is given on the communication system 1 in which the information processing device 10A installed in space A and the information processing device 10B installed in space B are connected to connect space A and space B.

Figure 6:
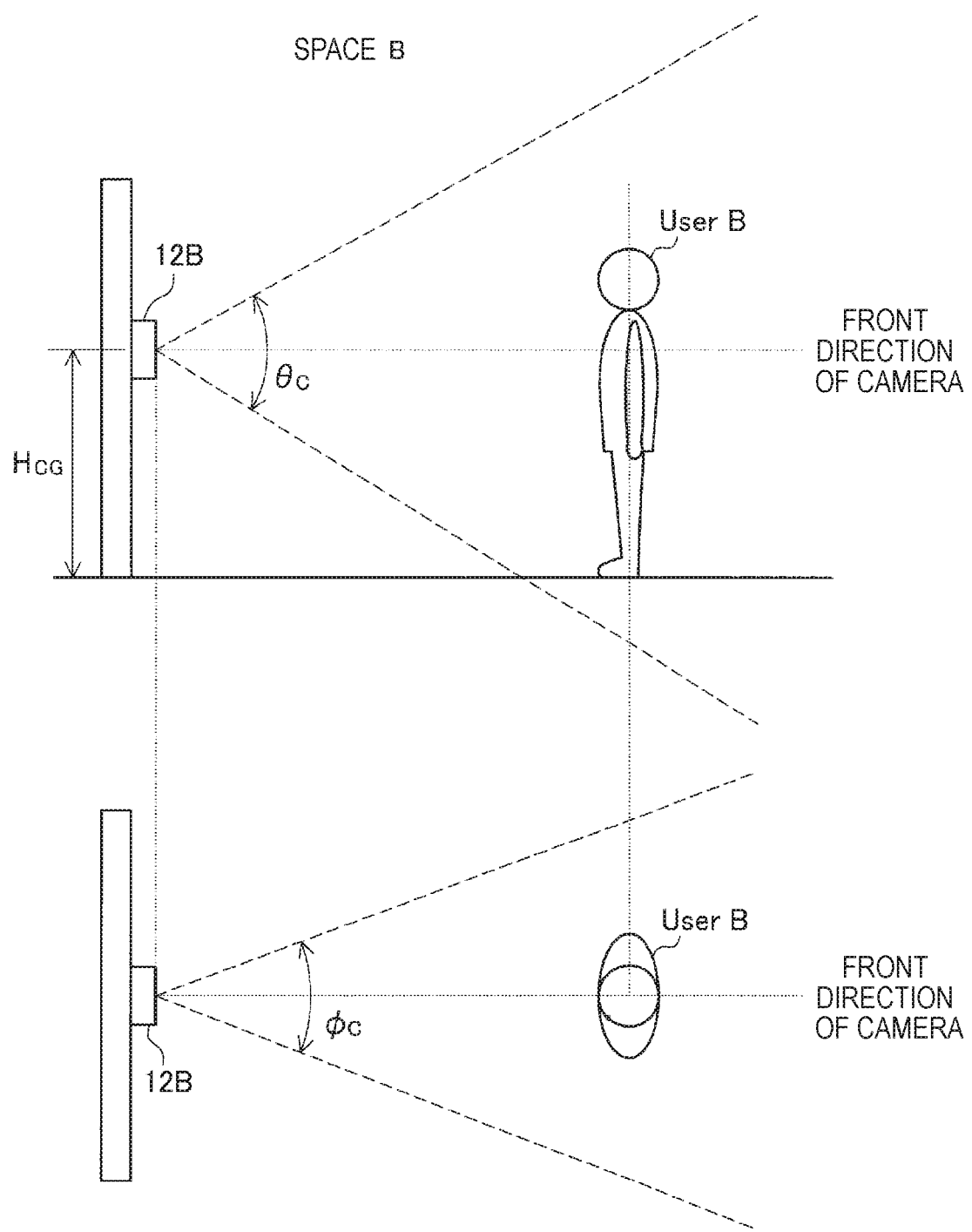
FIG. 6 is a diagram for describing spec information and installation position information of a camera according to the present embodiment.
Figure 7:
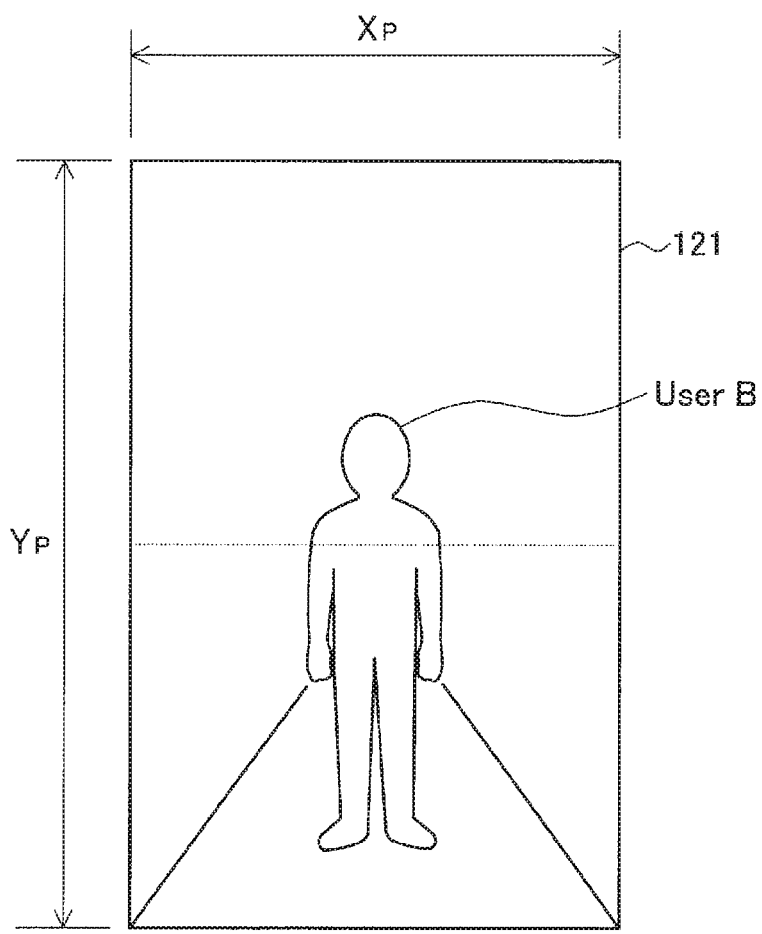
FIG. 7 is a schematic diagram illustrating an image captured by the camera illustrated in FIG. 6.

As illustrated in FIG. 5, first, the information processing device 10B acquires camera information (step S103), and transmits camera parameters to the information processing device 10A (step S106). Camera information includes specs of a camera and installation position information of a camera. Here, a positional relationship between a camera and a subject is described with reference to FIGS. 6 and 7. FIG. 6 is a diagram for describing spec information and installation position information of the camera 12B according to the present embodiment. The upper stage of FIG. 6 illustrates a side view of the camera 12B installed on a wall and a subject (user B) that is imaged, and the lower stage of FIG. 6 illustrates a top view of the camera 12B and user B. In addition, FIG. 7 illustrates an image 121 captured by the camera 12B. In this case, the following information is acquired as specs of the camera itself.

—Specs of Camera
Angle of view in direction horizontal to ground: $\varphi_C$
Angle of view in direction perpendicular to ground: $\theta_C$
Number of pixels in direction horizontal to ground: $X_P$
Number of pixels in direction perpendicular to ground: $Y_P$ In addition, in the case where the camera 12B is installed in a manner that an imaging direction is parallel to the ground, the information processing device 10B acquires a height $H_{CG}$ at which the camera 12B is installed as installation information as illustrated in FIG. 6.

Next, the information processing device 10A records received camera information in the storage unit 17 (step S109).

On the other hand, the information processing device 10B performs imaging by the camera 12B (step S112), and transmits a captured image (video) to the information processing device 10B (step S115). Imaging and transmission are continuously performed in real time.

Next, the information processing device 10A determines whether or not a face is included in the received video (step S118). Specifically, the image analysis unit 111 performs face detection.

Then, in the case where a face is included (Yes in step S118), the information processing device 10A determines whether or not life-size display is necessary (step S121). Whether or not life-size display is necessary is, for example, determined depending on ON/OFF of a life-size display function on the basis of user setting, or determined on the basis of a user action or the like. For example, in the case where it can be determined that the face is seen but user B is not in a situation of making a conversation with user A, such as the case where user B has only passed in front of the camera 12B during cleaning, the case where user B is watching TV while sitting in a sofa, or the case where user B is concentrating on study or work, the information processing device 10A determines that life-size display is unnecessary. Such an action of user B may be recognized on the basis of an analysis result by the image analysis unit 111, for example.

Next, in the case where it is determined that life-size display is necessary (Yes in step S121), the information processing device 10A calculates various distance information of the subject, and decides a display range (steps S124 to S130).

Figure 8:
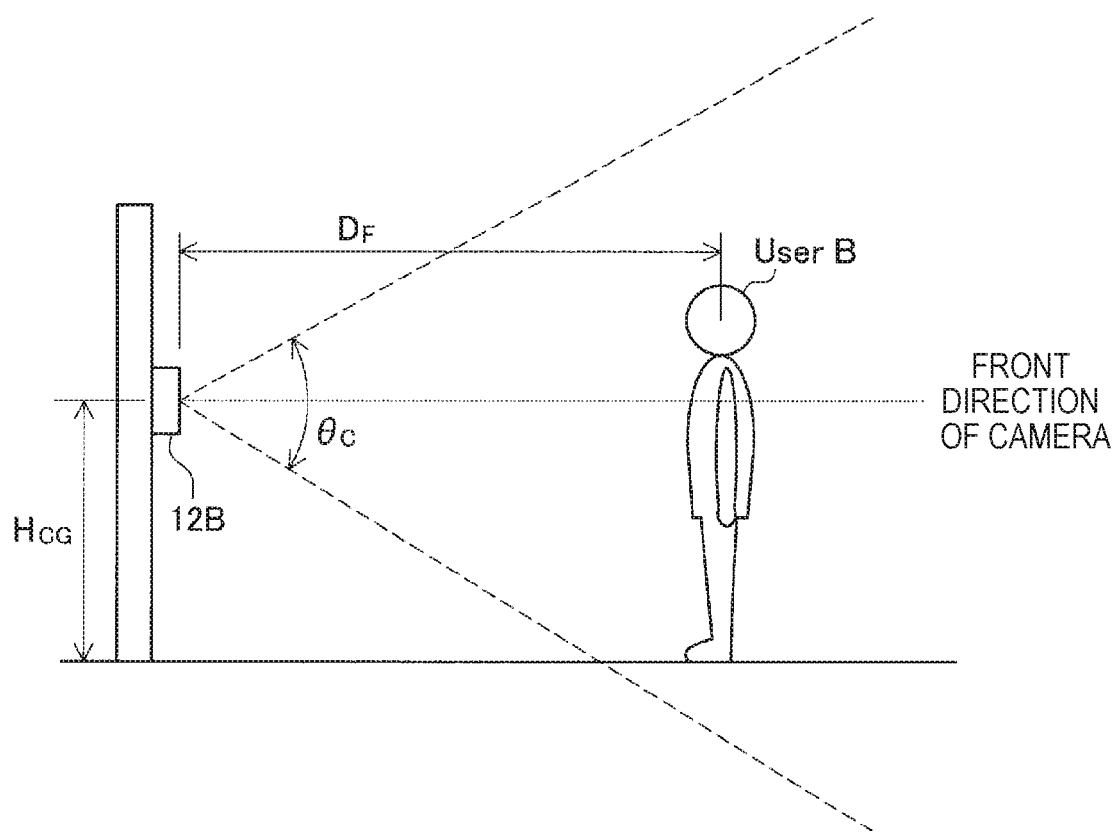
FIG. 8 is a diagram for describing a distance of a subject's face according to the present embodiment.

Specifically, the information processing device 10A calculates a distance of the face of the subject (user B who is a communication partner) appearing in the video by the calculation unit 112 (step S124). Here, an example of distance calculation of a face is described with reference to FIGS. 8 to 10. FIG. 8 is a diagram for describing a distance of a face. As illustrated in FIG. 8, in this specification, "distance of a face" is a distance $D_F$ from the camera 12B to the face of user B. Such a distance $D_F$ of a face can be calculated in the following manner, for example.

Figure 9:
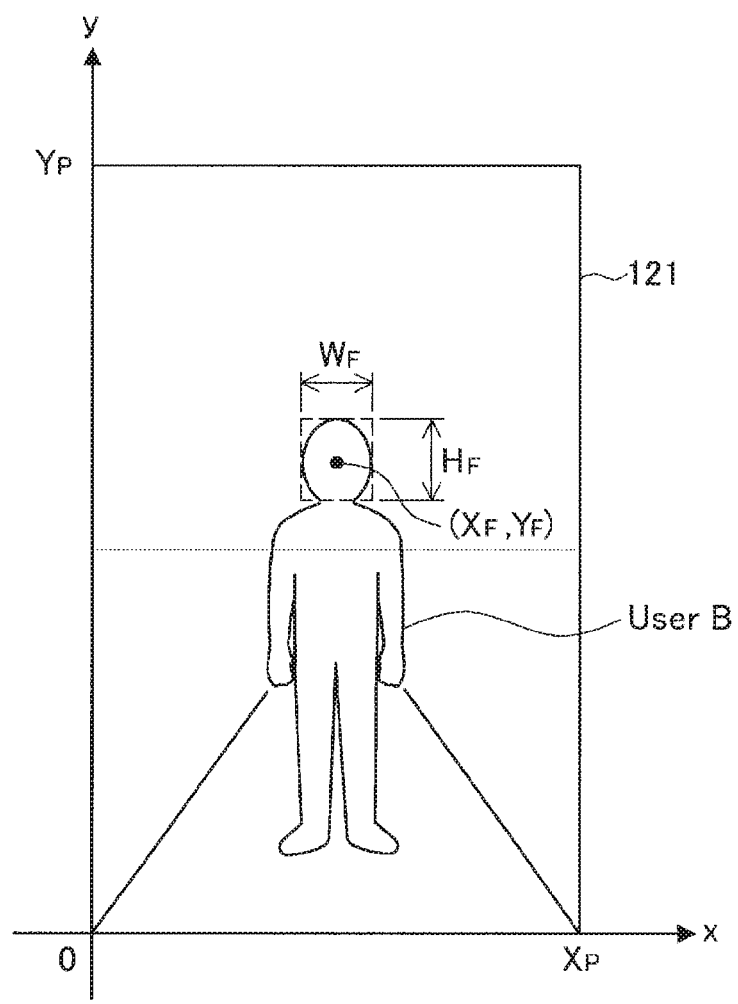
FIG. 9 is a diagram for describing facial information that can be acquired from a captured image.

FIG. 9 is a diagram for describing facial information that can be acquired from the captured image 121. As illustrated in FIG. 9, a horizontal direction of the image 121 is defined as an X axis, and a vertical direction is defined as a Y axis. The information processing device 10A according to the present embodiment can perform face detection and facial recognition from the image 121 by the image analysis unit 111, and obtain the following information.

Figure 10:
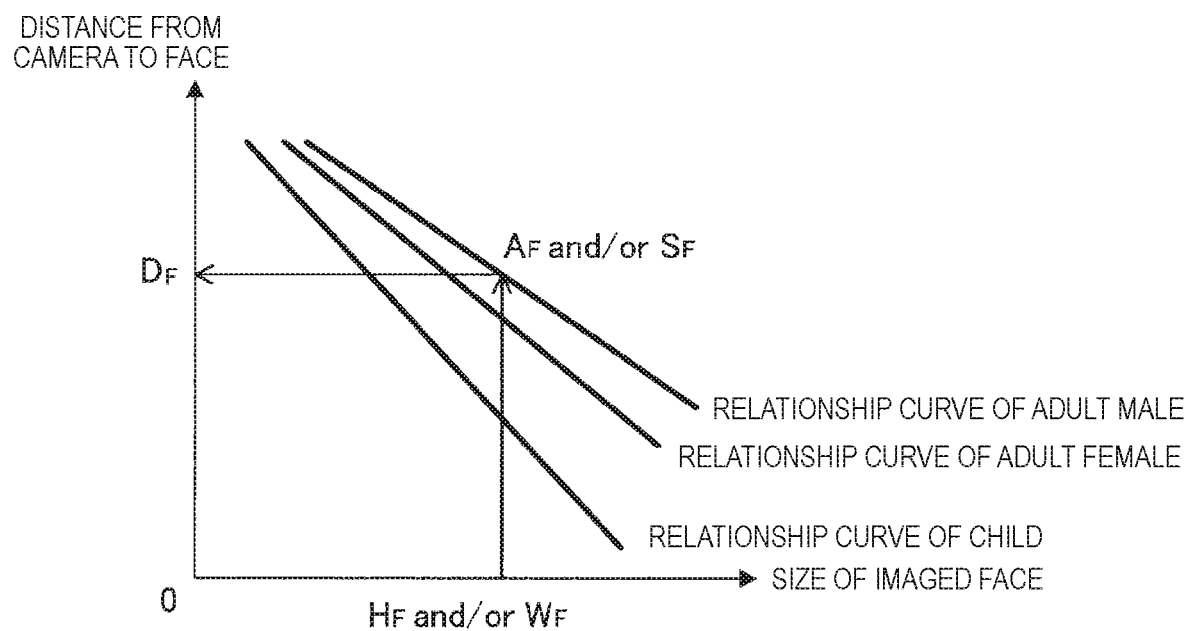
FIG. 10 illustrates an example of a distance conversion graph for each age or sex according to the present embodiment.

—Information that can be Obtained in Face Detection and Facial Recognition
x coordinate of face center in captured image: $X_F$
y coordinate of face center in captured image: $Y_F$
Width of face in captured image: $W_F$
Height of face in captured image: $H_F$
Age estimated from imaged face: $A_F$
Sex estimated from imaged face: $S_F$ Then, the calculation unit 112 of the information processing device 10A refers to a distance conversion graph for each age or sex prepared in advance, including a size "$H_F/W_F$" of the acquired face, an age "$A_F$", and also a sex "$S_F$" in some cases, and calculates a distance $D_F$ of the face from the camera 12B. FIG. 10 illustrates an example of a distance conversion graph for each age or sex. As illustrated in FIG. 10, the size of the imaged face is proportional to the distance from the camera to the face. The size of the face generally differs depending on age and sex; hence, as illustrated in FIG. 10, relationship curves of an adult male, an adult female, and a child are shown. Thus, the calculation unit 112 can calculate a distance of the subject from the camera from a size of a face and age or sex of the subject in an image. Note that the method for calculating a distance of a face described here is an example, and the present disclosure is not limited to this.

Figure 11:
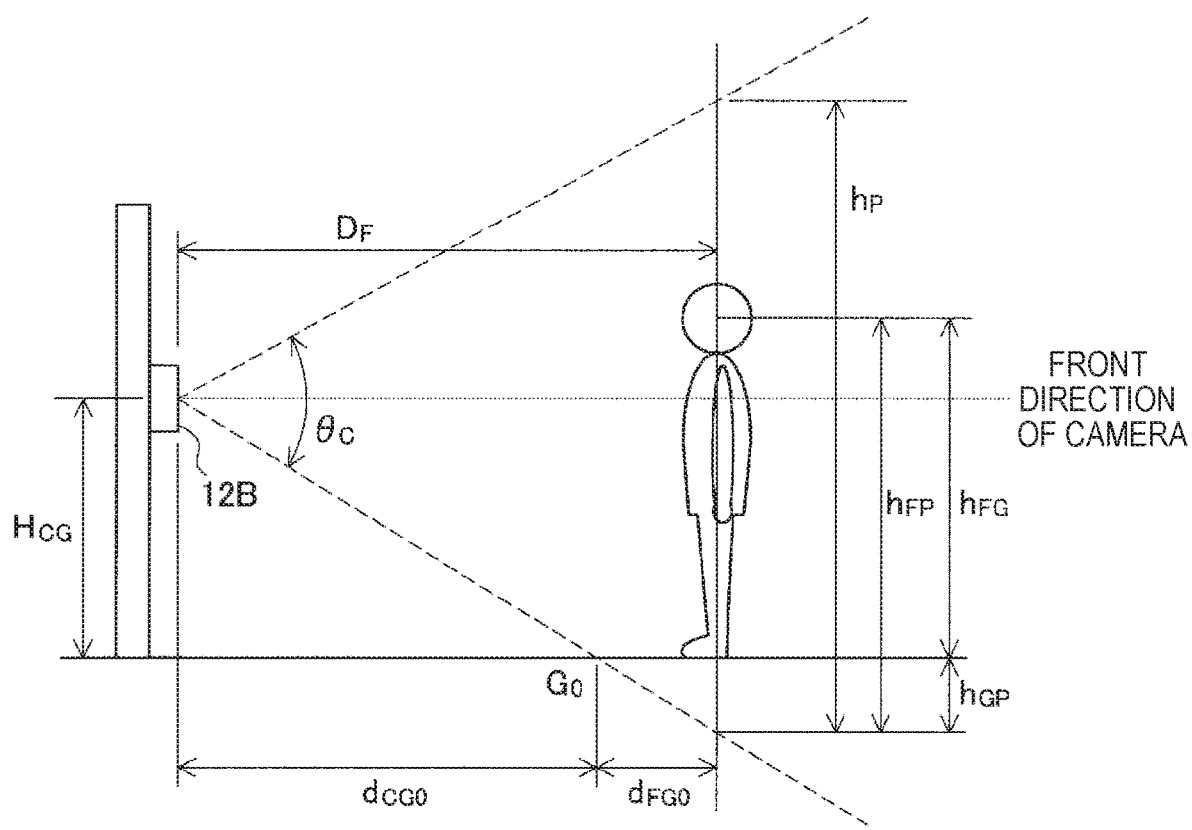
FIG. 11 is a diagram for describing the positional relationship between a camera and a subject in face height calculation according to the present embodiment.
Figure 12:
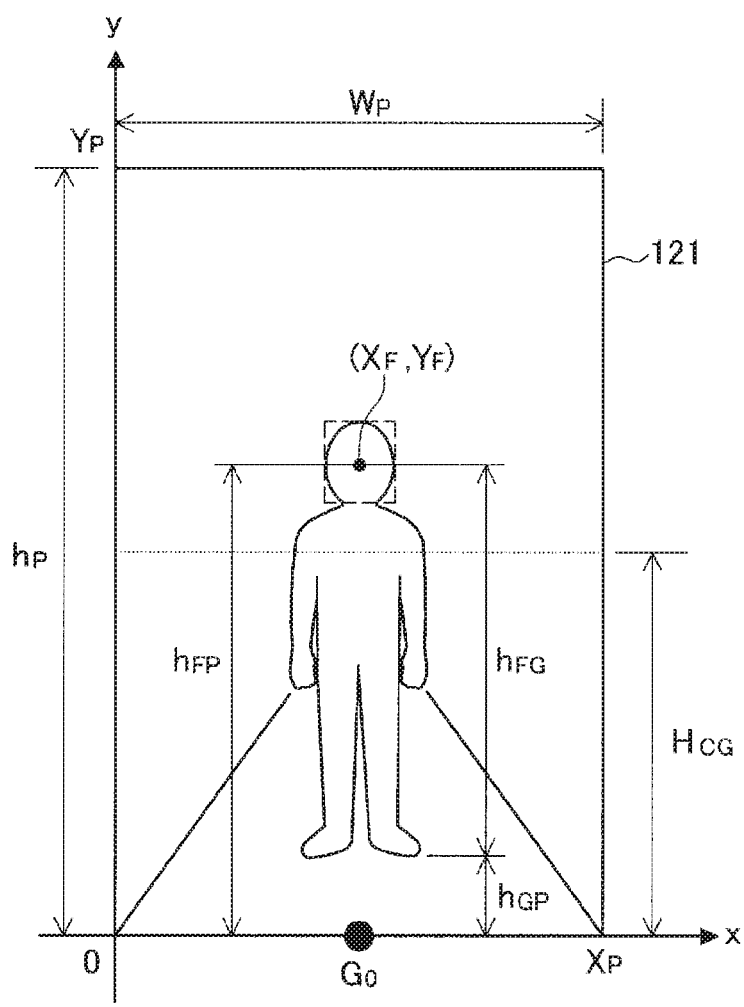
FIG. 12 is a diagram for describing distance information calculated from a captured image in face height calculation according to the present embodiment.

Then, the calculation unit 112 calculates a height of the face of the subject (step S112). Here, an example of calculation of a height of a face is described with reference to FIGS. 11 and 12. FIG. 11 is a diagram for describing calculation of a height, from the ground, of a face of a subject in a captured image. FIG. 12 is a diagram for describing distance information the can be acquired from a captured image in face height calculation.

The calculation unit 112 obtains a distance $d_{CG0}$, from the camera 12B, of a ground end $G_0$ on the nearest side of the captured image, on the basis of camera information acquired in step S109, according to the following formula 1.

[Math. 1]

$$d_{CG0} = \frac{H_{CG}}{\tan\frac{\theta_C}{2}} \qquad \text{formula 1}$$

In addition, the calculation unit 112 obtains a vertical actual length hp and a horizontal actual length $w_P$ of an image appearing in the camera 12B at the distance $D_F$ from the camera 12B, according to the following formulas 2 and 3, respectively.

[Math. 2]

$$h_P = 2*D_F*\tan\frac{\theta_C}{2} \qquad \text{formula 2}$$

[Math. 3]

$$w_P = 2*D_F*\tan\frac{\varphi_C}{2} \qquad \text{formula 3}$$

Furthermore, when $D_F > d_{CG0}$ (i.e., in the case where the distance from the camera 12B to the subject is longer than the distance from the camera 12B to the ground end $G_0$ on the nearest side of the captured image), the calculation unit 112 obtains a distance $d_{FG0}$ from $G_0$ to the person's face according to the following formula 4.

[Math. 4]

$$d_{FG0} = D_F - d_{CG0} \qquad \text{formula 4}$$

Consequently, from a homothetic ratio, a length of $h_{GP}$ illustrated in FIG. 11 is expressed by the following formula 5.

[Math. 5]

$$h_{GP} = \frac{d_{FG0}}{d_{CG0}}*H_{CG} = D_F*\tan\frac{\theta_C}{2} - H_{CG} \qquad \text{formula 5}$$

In addition, from coordinates of the face in the captured image, a length of $h_{FP}$ illustrated in FIG. 11 is expressed by the following formula 6.

[Math. 6]

$$h_{FP} = \frac{Y_F}{Y_P}*h_P = 2*\frac{Y_F}{Y_P}*D_F*\tan\frac{\theta_C}{2} \qquad \text{formula 6}$$

Consequently, the height of the face from the ground indicated by $h_{FG}$ in FIG. 11 is obtained by the following formula 7.

[Math. 7]

$$h_{FG} = h_{FP} - h_{GP} = \left(\frac{2Y_F - Y_P}{Y_P}\right)*D_F*\tan\frac{\theta_C}{2} + H_{CG} \qquad \text{formula 7}$$

As described above, according to the present embodiment, the information processing device 10A can calculate an actual height of a face of the subject (user B who is a communication partner) from the ground on the basis of spec information and installation position information of the camera 12B and an analysis result of an image captured by the camera 12B.

Figure 13:
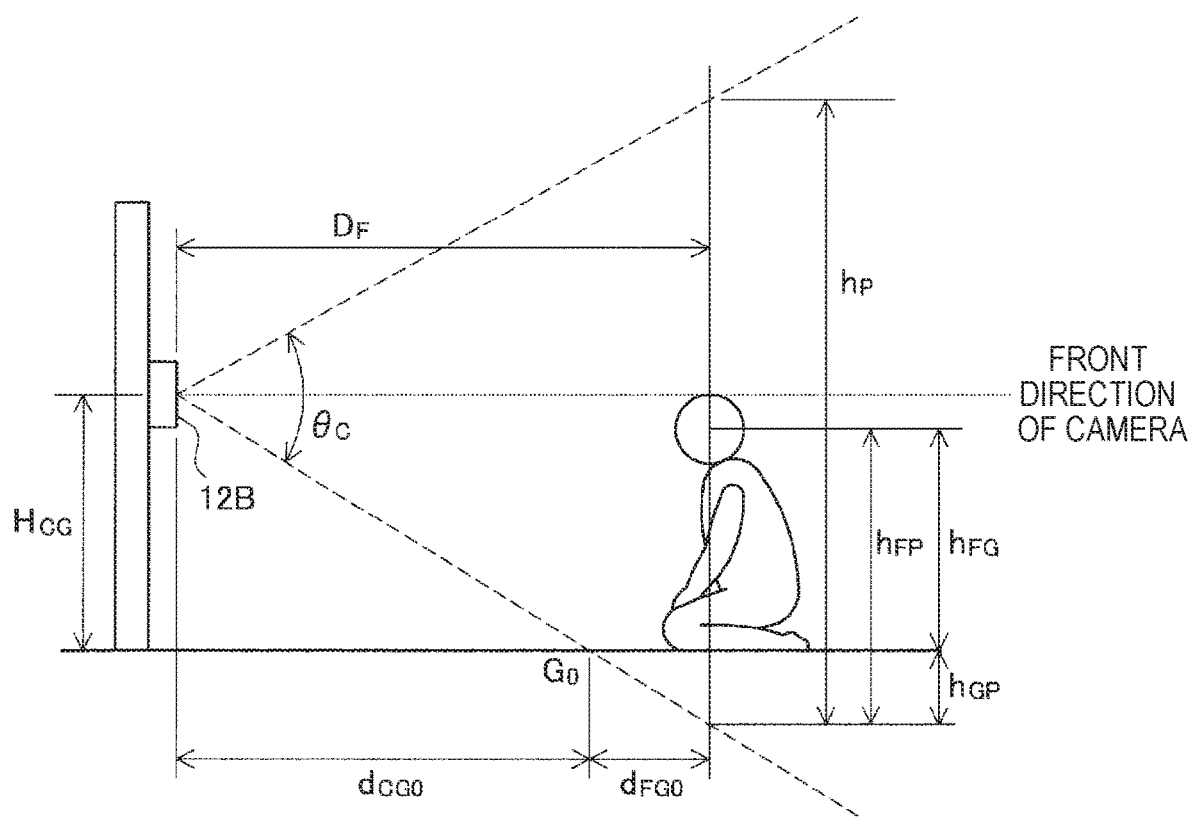
FIG. 13 is a diagram for describing the positional relationship between a camera and a subject in face height calculation in the case where the subject is not upright according to the present embodiment.
Figure 14:
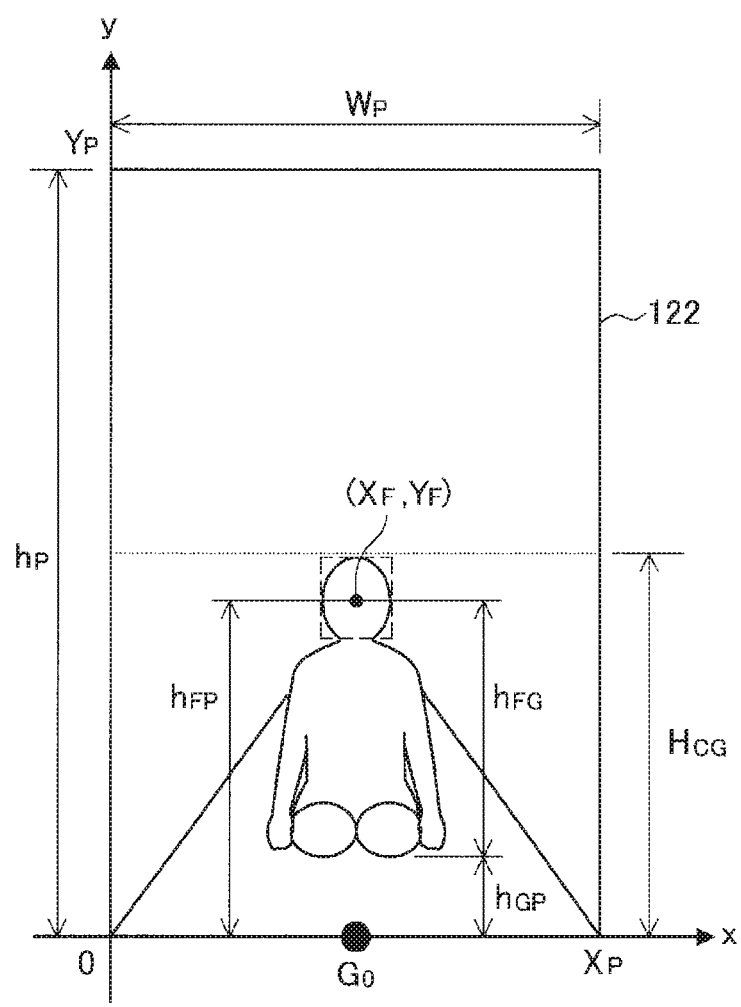
FIG. 14 is a diagram for describing distance information calculated from a captured image in face height calculation in the case where the subject is not upright according to the present embodiment.

Note that even if the subject is in a non-upright posture, a height $h_{FG}$ from the ground to the face can be obtained as long as a face is detected and the distance $D_F$ from the camera 12B to the face is calculated. Here, FIGS. 13 and 14 are diagrams for describing a case where a subject is not upright. FIG. 13 is a diagram for describing the positional relationship between a camera and a subject in face height calculation in the case where the subject is not upright. FIG. 14 is a diagram for describing distance information calculated from a captured image in face height calculation in the case where the subject is not upright.

In this case, the height $h_{FG}$ from the ground to the face illustrated in FIG. 14 can be obtained similarly by using the above formulas 1 to 7.

Figure 15:
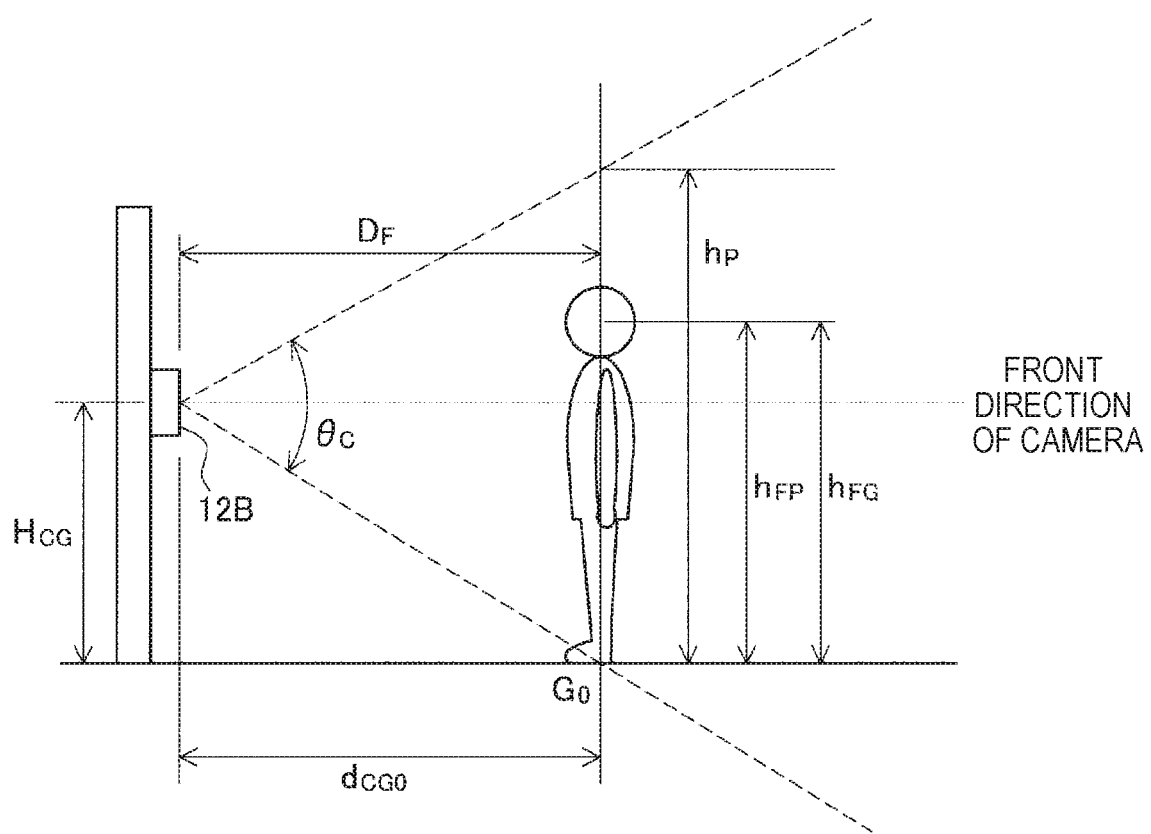
FIG. 15 is a diagram for describing the positional relationship between a camera and a subject in face height calculation in the case where the position of the subject's face is at a distance equal to that of the ground end according to the present embodiment.
Figure 16:
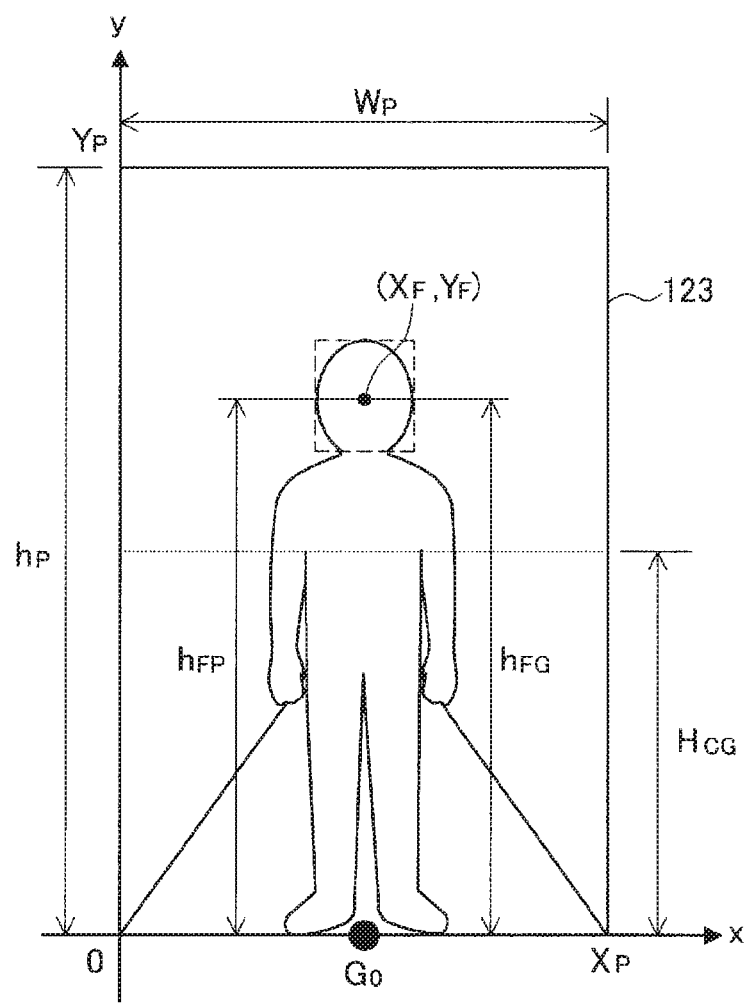
FIG. 16 is a diagram for describing distance information calculated from a captured image in face height calculation in the case where the position of the subject's face is at a distance equal to that of the ground end according to the present embodiment.

In addition, in the case where the position of the face from the camera 12B is at a distance equal to that of the ground end $G_0$ on the nearest side of the image captured by the camera 12B, that is, in the case where the distance $D_F$ from the camera 12B to the face=$d_{CG0}$, $d_{FG0}$=0 and $h_{GP}$=0 are satisfied. Here, FIGS. 15 and 16 are diagrams for describing a case where the position of the subject's face is at a distance equal to that of the ground end. FIG. 15 is a diagram for describing the positional relationship between a camera and a subject in face height calculation in the case where the position of the subject's face is at a distance equal to that of the ground end. FIG. 16 is a diagram for describing distance information calculated from a captured image in face height calculation in the case where the position of the subject's face is at a distance equal to that of the ground end. As illustrated in FIGS. 15 and 16, in the case where the subject is standing at a ground end on the nearest side of the image captured by the camera 12B (distance $D_F$=$d_{CG0}$), $d_{FG0}$=0 and $h_{GP}$=0 are satisfied. Consequently, the calculation unit 112 calculates the height $h_{FG}$ from the ground to the face by using the following formula 8.

[Math. 8]

$$h_{FG} = h_{FP} = \left(\frac{Y_F}{Y_P}\right)*2H_{CG} \qquad \text{formula 8}$$

Figure 17:
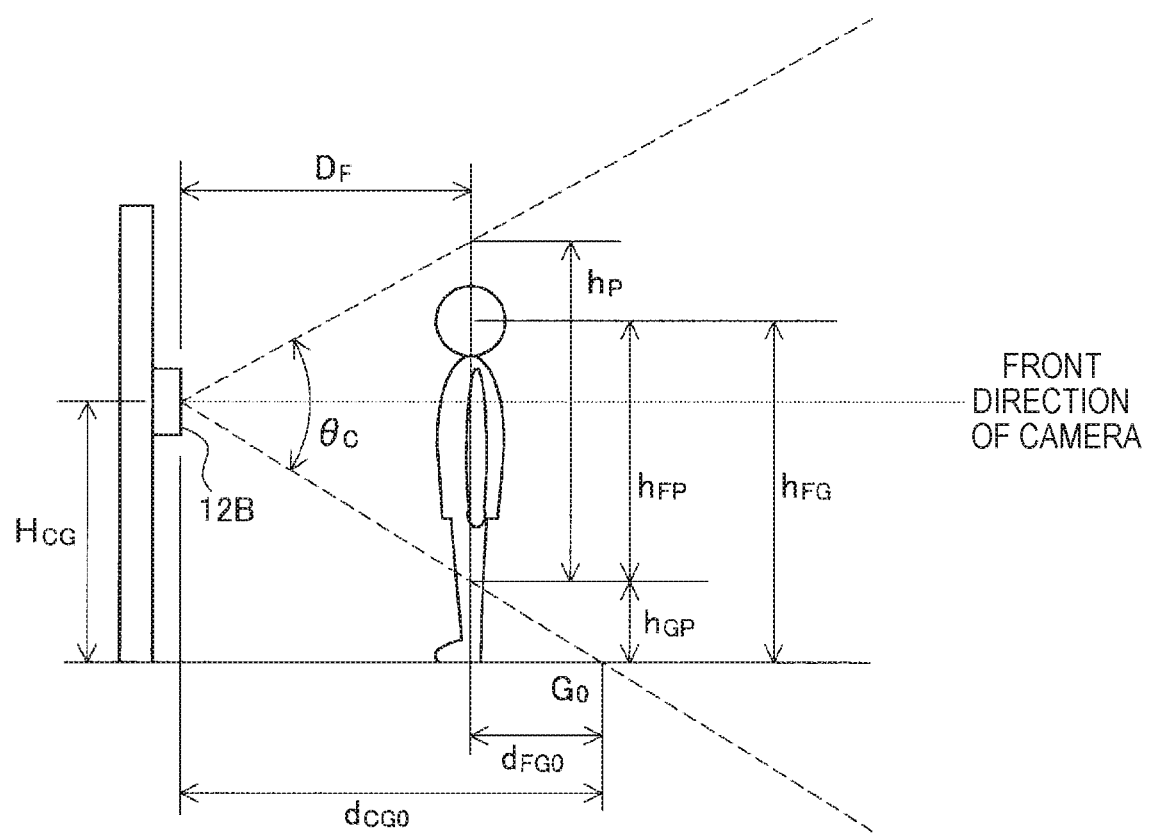
FIG. 17 is a diagram for describing the positional relationship between a camera and a subject in face height calculation in the case where the position of the subject's face is closer to the camera than the ground end is according to the present embodiment.
Figure 18:
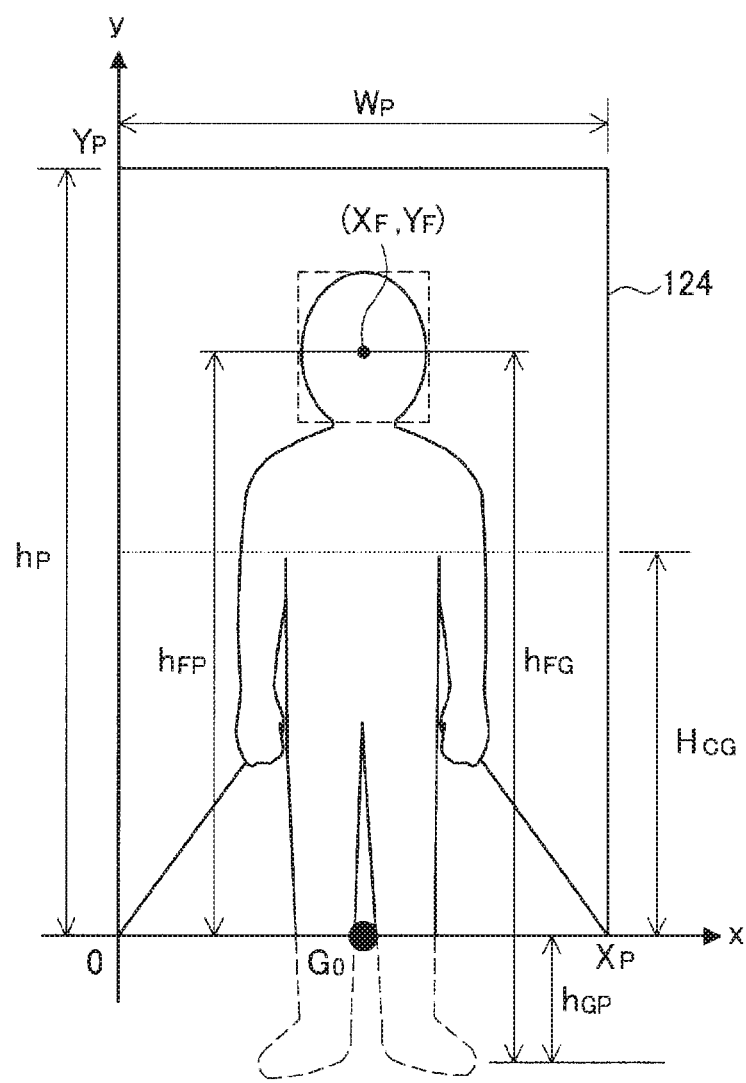
FIG. 18 is a diagram for describing distance information calculated from a captured image in face height calculation in the case where the position of the subject's face is closer to the camera than the ground end is according to the present embodiment.

Furthermore, in the case where the position of the subject's face is closer to the camera 12B than the ground end $G_0$ on the nearest side of the image captured by the camera 12B is, the distance $D_F$ from the camera 12B to the face <$d_{CG0}$. Here, FIGS. 17 and 18 are diagrams for describing a case where the position of the subject's face is closer to the camera 12B than the ground end is. FIG. 17 is a diagram for describing the positional relationship between a camera and a subject in face height calculation in the case where the position of the subject's face is closer to the camera 12B than the ground end is. FIG. 18 is a diagram for describing distance information calculated from a captured image in face height calculation in the case where the position of the subject's face is closer to the camera 12B than the ground end is. As illustrated in FIGS. 17 and 18, in the case where the subject is standing on the nearer side than a ground end on the nearest side of the image captured by the camera 12B (distance $D_F<d_{CG0}$), $d_{FG0}$ is expressed by the following formula 9.

[Math. 9]

$$d_{FG0}=d_{CG0}-D_F \qquad \text{formula 9}$$

Consequently, $h_{GP}$ illustrated in FIGS. 17 and 18 is expressed by the following formula 10.

[Math. 10]

$$h_{GP} = \frac{d_{FG0}}{d_{CG0}} * H_{CG} = H_{CG} - D_F * \tan\frac{\theta_C}{2} \qquad \text{formula 10}$$

Thus, the calculation unit 112 calculates the height $h_{FG}$ from the ground to the face by using the following formula 11.

[Math. 11]

$$h_{FG} = h_{FP} + h_{GP} = \left(\frac{2Y_F - Y_P}{Y_P}\right) * D_F * \tan\frac{\theta_C}{2} + H_{CG} \qquad \text{formula 11}$$

As described above, no matter in what distance the subject is standing with respect to the camera 12B, the height $h_{FG}$ from the ground to the face can be calculated.

Figure 19:
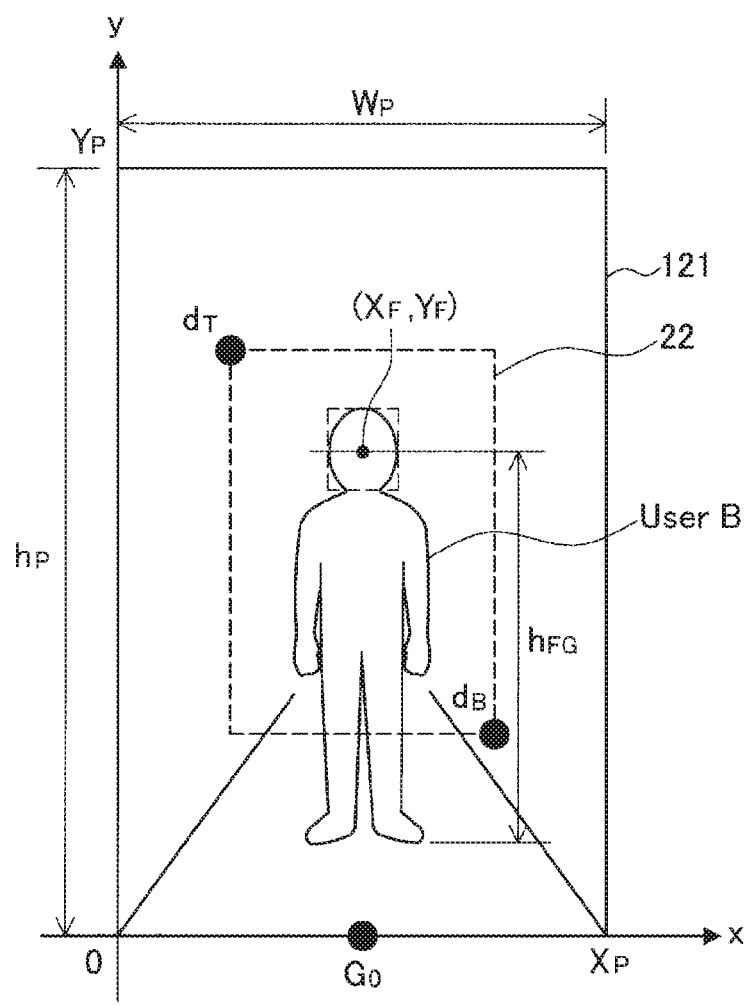
FIG. 19 is a diagram for describing a display range in an image received from an information processing device according to the present embodiment.
Figure 20:
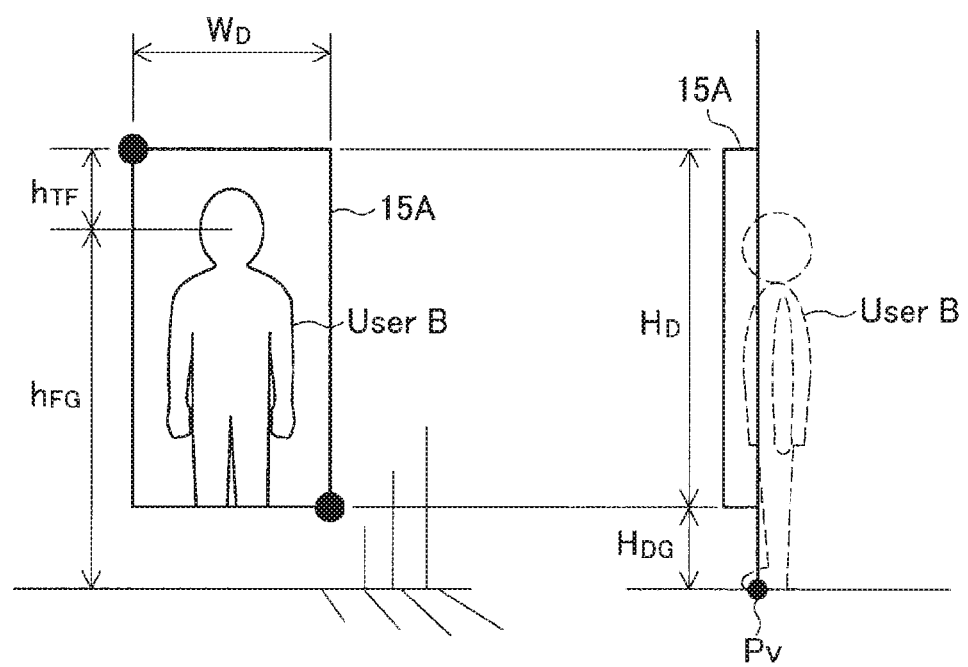
FIG. 20 is a diagram for describing actual dimensions of a display and a display image that is displayed according to the present embodiment.

Then, as illustrated in FIG. 5, the image generation unit 113 of the information processing device 10A appropriately decides a range of display on the display 15A from a received image, on the basis of the height $h_{FG}$ from the ground to the face calculated by the calculation unit 112 and a physical size and installation position information (a distance between a lower side of the display and the ground) of the display 15A (step S130). Here, decision of the display range of display on the display 15A is described with reference to FIGS. 19 and 20. FIG. 19 is a diagram for describing a display range 22 in the image 121 received from the information processing device 10B. FIG. 20 is a diagram for describing actual dimensions of the display 15A and a display image that is displayed.

Vertical and horizontal lengths (length in perpendicular direction: $H_D$, length in horizontal direction of display: $W_D$) of the display 15A illustrated in FIG. 20 and a distance $H_{DG}$ between the lower side and the ground are obtained in advance as size information and installation position information of the display 15A.

On the basis of the size information and the installation position information, and the height $h_{FG}$ from the ground to the subject's face calculated in step S127, coordinates of an upper left pixel $d_T$ ($x_T$, $y_T$) and a lower right pixel $d_B$ ($x_B$, $y_B$) of the captured image are calculated and the display range 22 is decided, as illustrated in FIG. 19, in order to display an appropriate image at an appropriate position of the display 15A (more specifically, to display the subject's face at the same height as the actual height from the ground).

Specifically, first, the image generation unit 113 calculates y coordinates of $d_T$ and $d_B$. Here, since $h_{FG}$ (how tall the subject is) is given as a physical distance, a distance $h_{TF}$ between the center of the face and an upper side of the screen is obtained according to the following formula 12.

[Math. 12]

$$h_{TF}=(H_D+H_{DG})-h_{FG} \qquad \text{formula 12}$$

Such a physical distance is $$y_n = \frac{Y_P}{h_P} * h_{TF}$$

when expressed by the number of pixels of the captured image; hence, the y coordinate $y_T$ of $d_T$ is as follows.

$$y_T = Y_F + y_n = Y_F + \frac{Y_P}{h_P} * ((H_D + H_{DG}) - h_{FG})$$

In addition, similarly, the y coordinate $y_B$ of $d_B$ is as follows.

$$y_B = Y_F - \frac{Y_P}{h_P} * (h_{FG} - H_{DG})$$

Next, x coordinates of $d_T$ and $d_B$ are obtained. Specifically, they are obtained respectively by the following formulas 13 and 14 in a manner that the face is located at the center of the display screen, for example.

[Math. 13]

$$x_T = X_F - x_n = X_F - \frac{X_P}{w_P} * \frac{W_D}{2} \qquad \text{formula 13}$$

[Math. 14]

$$x_B = X_F + x_n = X_F + \frac{X_P}{w_P} * \frac{W_D}{2} \qquad \text{formula 14}$$

As described above, the image generation unit 113 calculates coordinates of an upper left pixel $d_T$ ($x_T$, $y_T$) and a lower right pixel $d_B$ ($x_B$, $y_B$) of the captured image, and decides a range to be clipped of the captured image. By displaying a display image clipped in this manner on the display 15A, user B who is the communication partner looks as if being actually present at the position where the display 15A is installed (the virtual standing position Pv), as illustrated in FIG. 20.

Then, as illustrated in FIG. 5, it is determined whether or not a face is within the decided display range 22 (step S133).

Figure 21:
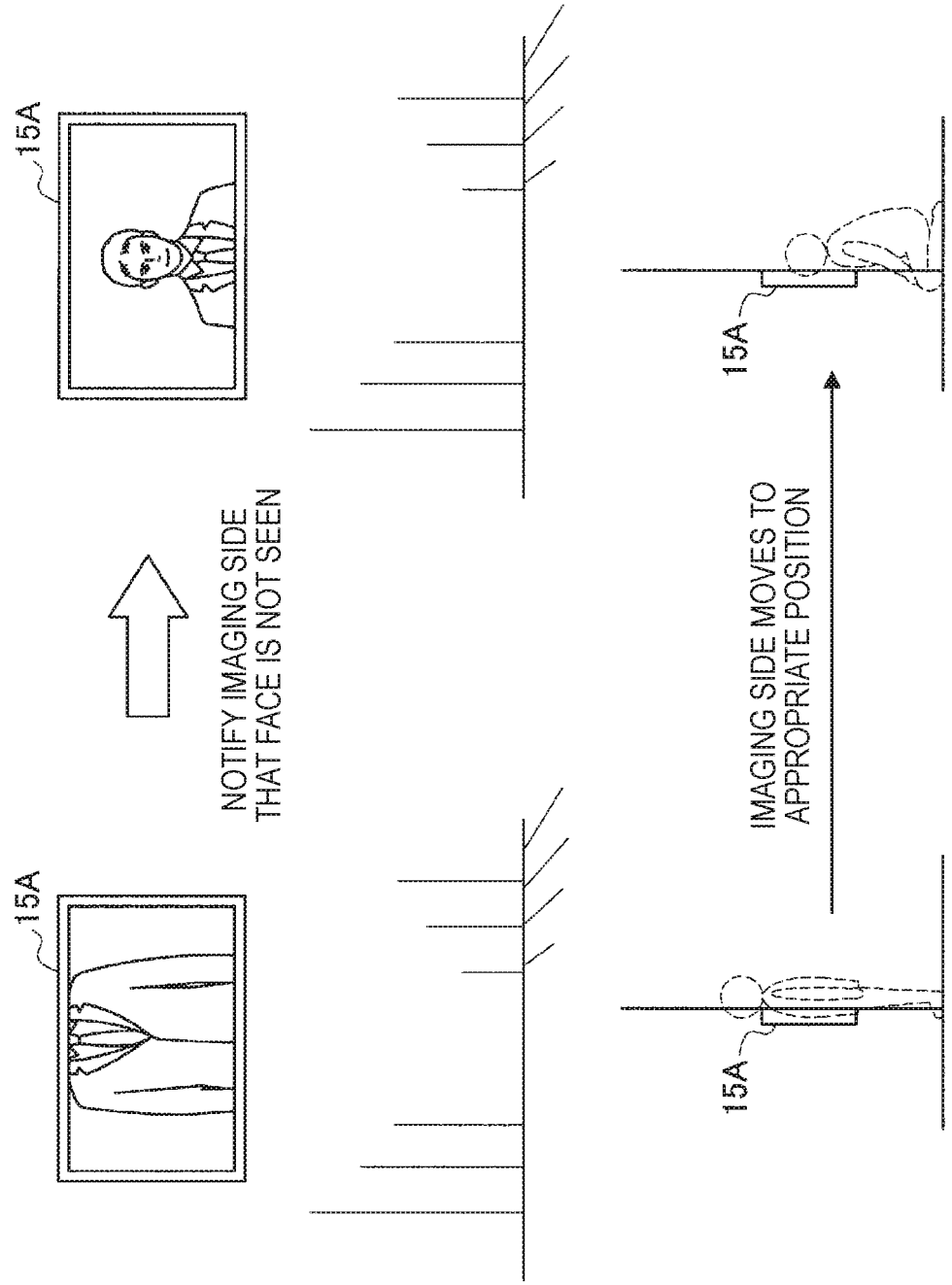
FIG. 21 is a diagram for describing guiding of an imaging side according to the present embodiment.

In the case where a face is not within the display range, the information processing device 10A transmits, to the information processing device 10B, guiding information for guiding user B by sound, text, or the like in a manner that the face falls within the display range 22 (step S136). That is, as a result of deciding the display range so as to display the life-size subject in accordance with the size and installation position of the display 15A, the partner's face does not fall within the display 15A in some cases, as illustrated on the left side of FIG. 21, for example. In this case, the information processing device 10A can notify the imaging side that the face is not seen, and guide the subject to move to an appropriate imaging position as illustrated on the right side of FIG. 21.

Next, on the basis of guiding information, the information processing device 10B performs display of a guiding message, or the like on the display 15B (step S139). The information processing device 10A and the information processing device 10B perform two-way communication, and the camera 12 and the display 15 are installed in each space; hence, the guiding message can be displayed on the display 15B on the imaging side. Here, with reference to FIGS. 22 and 23, an example of guiding of the imaging side according to the present embodiment is described. FIGS. 22 and 23 are diagrams for describing an example of guiding of the imaging side according to the present embodiment.

As illustrated in the upper stage of FIG. 22, a guiding message 31 such as "Your face is outside display area. Please move down a little." may be displayed on the display 15B on the imaging side, for example. On the display 15B on the imaging side, a captured image of user A on the partner side is displayed in real time by two-way communication. By the guiding message 31 being displayed on such a screen, user B can move in a manner that his/her own face enters a display area on the user A side. In addition, as illustrated in the lower stage of the FIG. 22, an image 32 of user B captured by the camera 12B on the imaging side may be displayed in real time on the display 15B on the imaging side, and a display area display 33 indicating an area displayed on the partner side may be displayed superimposed on the image 32. Thus, a display area on the partner side (user A side) can be visualized to guide user B.

In addition, as illustrated in the upper stage of FIG. 23, in a portion that does not obstruct conversation, such as a periphery of a screen, a frame 34 may be displayed for notification, for example, in blue when user B is at an appropriate position, and in red when user B is at an inappropriate position. In addition, as illustrated in the lower stage of FIG. 23, a method of guiding by sound 35 such as "Your face is outside display area. Please move down a little." is also possible. Note that instead of feedback by an audio message, sound effects or BGM different between when at an appropriate position and when at an inappropriate position can be played for notification. For example, sound may be made like "beeeeep" when entering an appropriate range, and sound may be kept being made like "beep, beep, beep" when in an inappropriate region.

Then, as illustrated in FIG. 5, when it is determined that a face is within the display range (Yes in step S133), the image generation unit 113 of the information processing device 10 determines whether or not an image of the decided display range is sufficient (step S136).

In the case where an image of the display range is lacking (No in step S136), the image generation unit 113 complements a lacking region (step S139). This is because as a result of deciding an appropriate display range as described above, a case may occur in which part of the display range of the display 15A does not have image information. This will be specifically described with reference to FIG. 24.

Figure 24:
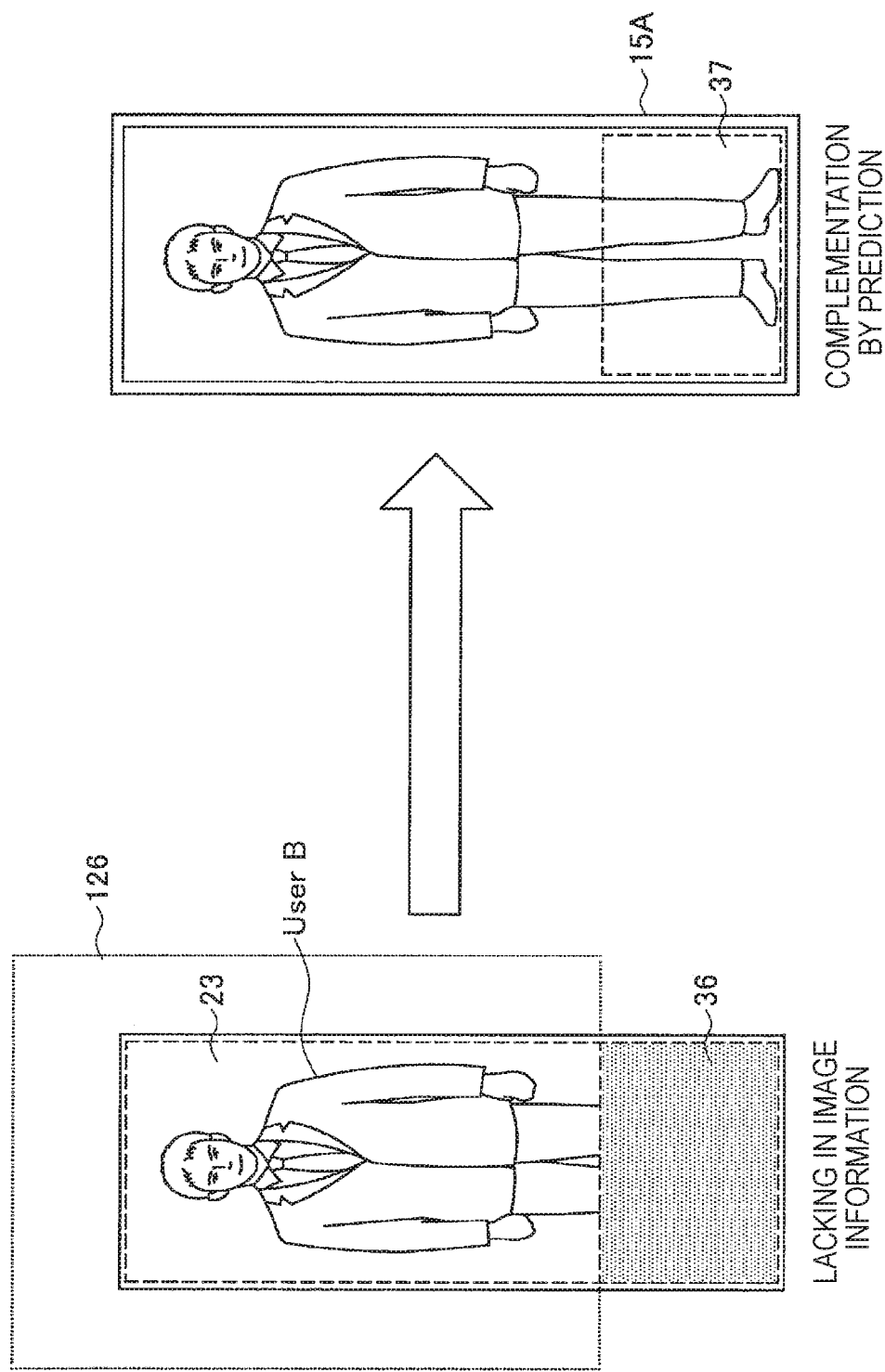
FIG. 24 is a diagram for describing image complementation according to the present embodiment.

FIG. 24 is a diagram for describing image complementation. As illustrated on the left of FIG. 24, as a result of adjusting a center position of the subject's face in an image 126 received from the partner side so as to perform life-size display, a portion 36 lacking in image information occurs in some cases in a range 23 of display on the display 15A. For example, in the case where the subject gets too close to the camera, or the like, the lacking portion 36 may occur as illustrated on the left of FIG. 24. In this case, the image generation unit 113 complements image information of the lacking portion as illustrated on the right of FIG. 24. A method for generating a complementary image 37 is not particularly limited, and it can be generated by prediction from past images and a current image, for example.

Then, as illustrated in FIG. 5, the display control unit 114 displays an image of the decided display range on the display 15A (step S142).

Note that in the case where a face is not included in the received image (No in step S118), or in the case where it is determined not to be necessary to perform life-size display (No in step S121), the display control unit 114 displays the received image as it is on the display 15A (step S142).

The operation processing of the information processing device 10 according to the present embodiment has been described. Note that in the example illustrated in FIG. 5, one-way processing of transmitting a captured image from the information processing device 10B to the information processing device 10A is described for convenience in description; however, the communication system 1 according to the present embodiment is capable of two-way communication, and the processing described above may be performed similarly between the information processing devices 10 that are connected.

In addition, the above operation processing mainly describes transmission of a captured image (video), but audio information of the subject may also be transmitted together.

4. Other Examples

<4-1. Superimposition on CG Space>>

In addition to the embodiment described above, the information processing device 10 may clip a person portion from a captured image, for example, and display the person portion superimposed on a computer graphics (CG) space. This will be described with reference to FIG. 25.

Figure 25:
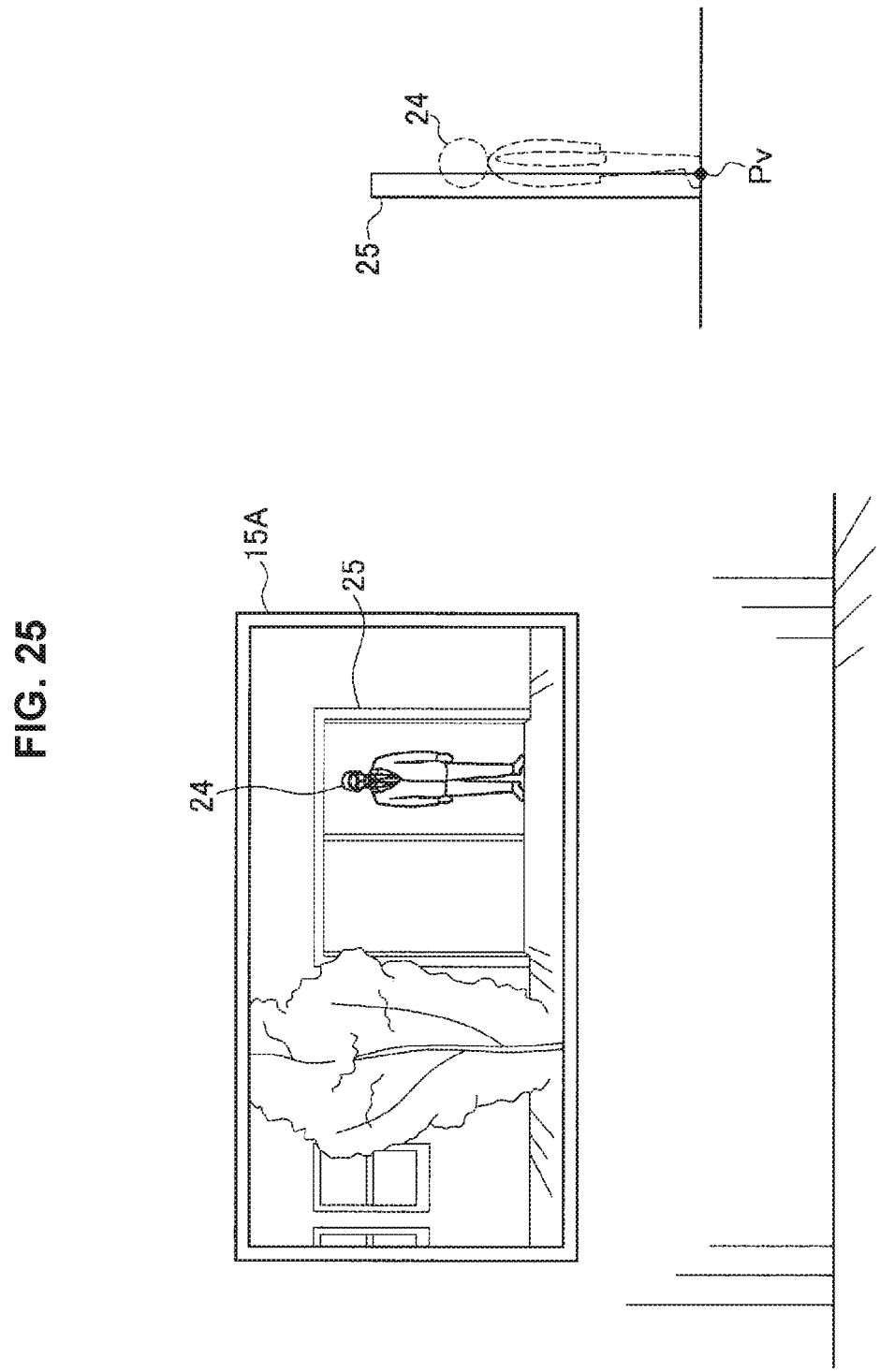
FIG. 25 is a diagram for describing life-size display in a CG space according to another example of the present disclosure.

FIG. 25 is a diagram for describing life-size display in a CG space according to another example of the present disclosure. As illustrated in FIG. 25, in the case where a CG space is displayed on the display 15A, a person (subject) 24 clipped from a captured image received from a communication destination is displayed in life-size display on the assumption that the person 24 is standing at the same place as a window 25 or a door in the CG space, for example.

Specifically, as in the embodiment described above, the information processing device 10 acquires an actual height of the person 24 from the ground to the face, from the received image and camera information on the imaging side, and life-size display is performed on the assumption that the same place as the window 25 or the door in the CG space is the virtual standing position Pv, as illustrated in FIG. 25.

<4-2. Delivery to Plurality of Locations>

Figure 26:
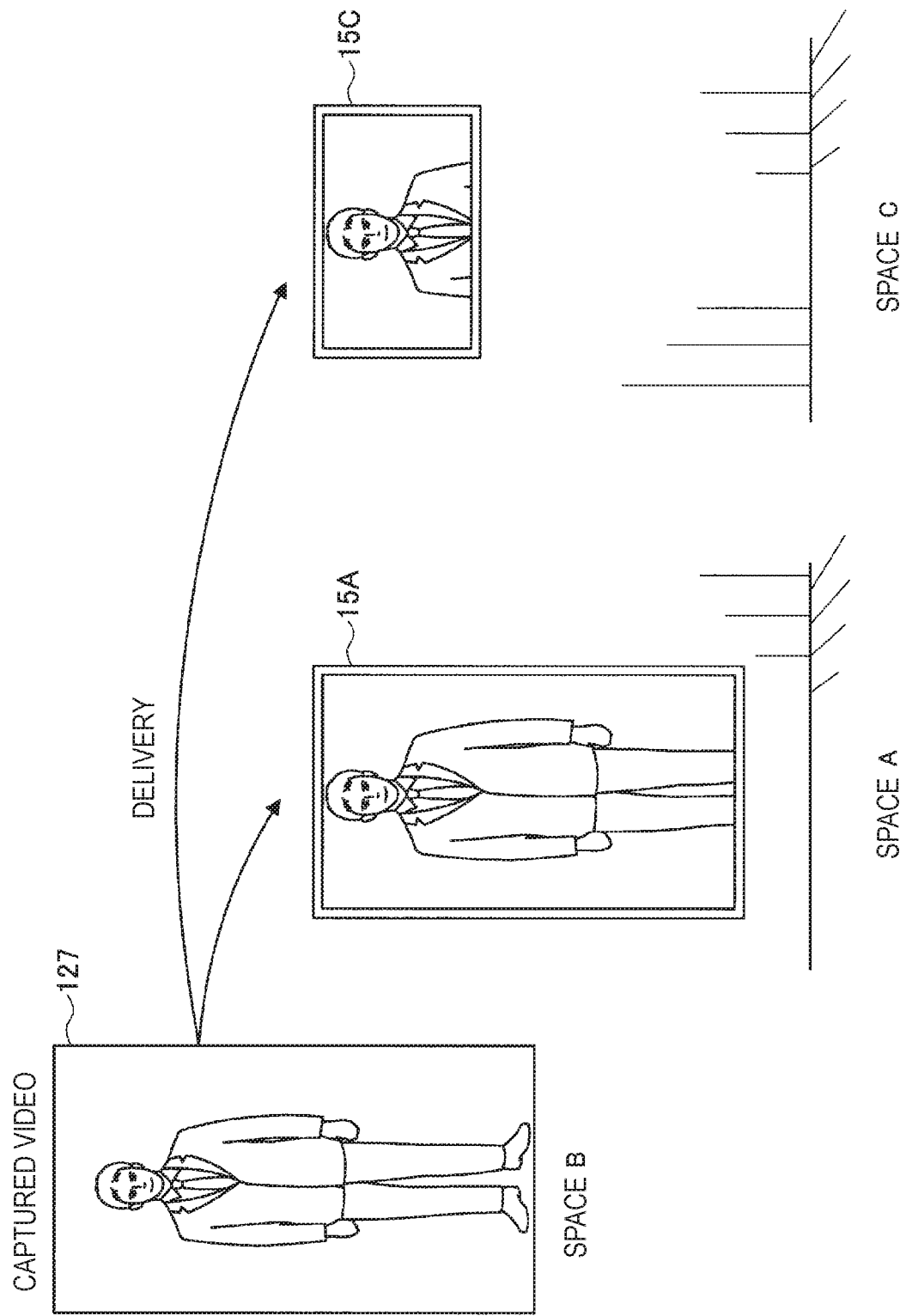
FIG. 26 is a diagram for describing delivery to a plurality of spaces according to another example of the present disclosure.

In addition, as another example of the present disclosure, the information processing device 10 can deliver video to a plurality of locations (spaces). FIG. 26 is a diagram for describing delivery to a plurality of spaces.

As illustrated in FIG. 26, video 127 captured in space B, for example, may be delivered to space A and space C by the information processing device 10B. The display 15A in space A and a display 15C in space B differ in physical size and installation position as illustrated in FIG. 26, but processing (decision of a display range, complementation of a lacking image, etc.) of the video 127 is performed by each of the information processing devices 10A and 10C on the reception side (see steps S118 to S142 in FIG. 5); thus, life-size display can be performed appropriately in accordance with environment on the reception side.

5. Hardware Configuration

The embodiment of the present disclosure has been described. The processing performed by the information processing device 10 described above may be achieved by operating cooperatively software and hardware of an information processing device 100 (to be described later).

Figure 27:
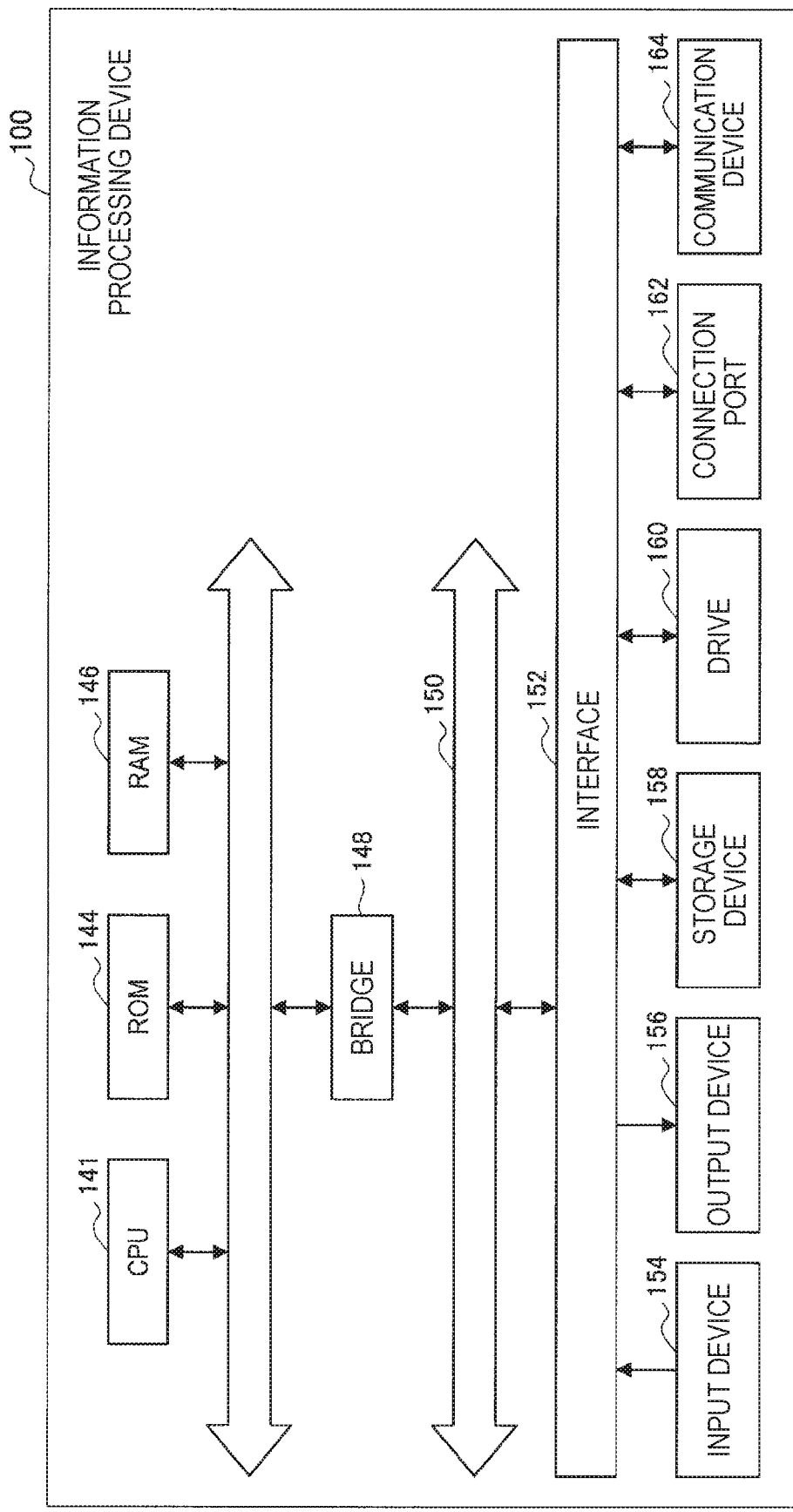
FIG. 27 is an explanatory diagram illustrating a hardware configuration of an information processing device according to the present disclosure.

FIG. 27 is an explanatory diagram illustrating a hardware configuration of the information processing device 100 according to the present disclosure. As illustrated in FIG. 27, the information processing device 100 includes a central processing unit (CPU) 142, read only memory (ROM) 144, random access memory (RAM) 146, a bridge 148, a bus 150, an interface 152, an input device 154, an output device 156, a storage device 158, a drive 160, a connection port 162, and a communication device 164.

The CPU 142 functions as an arithmetic processing device and a control device to enable operation of the image analysis unit 111, the calculation unit 112, the image generation unit 113, the display control unit 114, and the transmission control unit 115 of the information processing device 10 by operating cooperatively with various kinds of programs. In addition, the CPU 142 may be a microprocessor. The ROM 144 stores programs, operation parameters, or the like used by the CPU 142. The RAM 146 transiently stores programs used when the CPU 142 is executed, parameters that change as appropriate when the CPU 142 is executed, or the like. The ROM 144 and the RAM 146 implement part of the storage unit 17 in the information processing system. The CPU 142, the ROM 144, and the RAM 146 are connected to each other through an internal bus including a CPU bus and the like.

The input device 154 includes an input means to which the user inputs information such as the camera 12 and the microphone 13 of the information processing device 10, a mouse, a keyboard, a touchscreen, a button, a switch, and a lever, an input control circuit that generates an input signal on the basis of imaging by a camera or the user input and outputs the generated input signal to the CPU 142, and the like. By operating the input device 154, the user of the information processing device 100 can input various kinds of data into the information processing device 100 and instruct the information processing device 100 to perform a processing operation.

The output device 156, for example, performs output from a device such as a liquid crystal display (LCD) device, an organic light emitting diode (OLED) device, or a lamp, as an example of the display 15 of the information processing device 10. In addition, the output device 156 performs audio output from a speaker, a headphone, or the like, as an example of the speaker 16 of the information processing device 10.

The storage device 158 is a data storage device. The storage device 158 may include a storage medium, a recording device that records data on the storage medium, a reading device that reads data from the storage medium, a deletion device that deletes data recorded on the storage medium, and the like. The storage device 158 stores various kinds of data or a program to be executed by the CPU 142.

The drive 160 is a reader/writer for a storage medium, and is incorporated in or externally attached to the information processing device 100. The drive 160 reads information recorded in a removable storage medium that is mounted, such as a magnetic disk, an optical disc, a magneto-optical disk, or semiconductor memory, and outputs the information to the RAM 144. The drive 160 is also capable of writing information to the removable storage medium.

The connection port 162 is, for example, a bus used to connect to an information processing device or peripheral equipment outside the information processing device 100. In addition, the connection port 162 may be a universal serial bus (USB).

The communication device 164 is, for example, a communication interface implemented by communication equipment for connection with a network, as an example of the communication unit 14 of the information processing device 10. In addition, the communication device 164 may be a device supporting infrared communication, a communication device supporting a wireless local area network (LAN), a communication device supporting long term evolution (LTE), or a wired communication device that performs wired communication.

6. Conclusion

As described above, the communication system 1 according to the embodiment of the present disclosure can give a sense of realism as if a partner connected in video communication is present in one's sight.

Specifically, in capturing video, camera information (camera specs and installation position information) is transmitted to the partner side. On the reception side, a physical size and installation position information of a display are grasped in advance, an actual distance of a person is estimated from a size of the person's face appearing in received video, and a height of the person's face from the ground is calculated. Then, on the reception side, a display position of the person's face is adjusted assuming that a position of the display installed on a wall or the like is a virtual standing position, and video obtained by clipping an appropriate range is subjected to enlargement, reduction, complementation, or the like as needed, and displayed in life-size display.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, a computer program for causing hardware such as a central processing unit (CPU), read only memory (ROM), and random access memory (RAM) built in the information processing device 10 or the processing server 30 described above to exhibit functions of the information processing device 10 or the processing server 30 can also be produced. Furthermore, a computer-readable storage medium in which the computer program is stored is also provided.

In addition, the display range is decided by calculating the actual height of the face of the subject (communication partner) from the ground from the received image in the embodiment described above, but this is an example; in the present embodiment, an actual height of a predetermined body area of the subject from the ground may be calculated, and the display range may be decided so as to perform life-size display.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

An information processing device including:

a communication unit configured to transmit and receive an image to and from a communication connection destination; and a control unit configured to control a display range and a position of the image, on the basis of a display size and installation position information of a display device that displays the image, and distance information of a subject appearing in the image that is acquired from the image.

(2)

The information processing device according to (1), in which the installation position information includes height information of the display device from a ground, and the control unit calculates an actual height from the ground to a face as the distance information of the subject, and performs control so as to perform life-size display of the subject, assuming that the subject is standing at substantially a same position as the display device.

(3)

The information processing device according to (2), in which in a case of assuming that the subject is standing at substantially the same position as the display device, the control unit decides the display range of the image in a manner that the face of the subject is located at a same position as the actual height.

(4)

The information processing device according to (2) or (3), in which the control unit calculates the height from the ground to the face of the subject, on the basis of a distance from a camera at the communication connection destination to the subject and spec information of the camera, the distance being estimated on the basis of a size of the face appearing in the image and an age of the subject.

(5)

The information processing device according to (4), in which the control unit estimates the distance from the camera to the subject on the basis of a relationship curve that indicates a relationship between a size of a face appearing in an image and a distance from a camera to a face and differs depending on an age and/or a sex of the subject.

(6)

The information processing device according to (4), in which the spec information of the camera includes angle-of-view information in a direction perpendicular to the ground and angle-of-view information in a direction perpendicular to the ground.

(7)

The information processing device according to (3), in which in a case where the face is not within the decided display range, the control unit performs control so as to notify the communication connection destination that the face is outside the display range.

(8)

The information processing device according to (7), in which the control unit makes notification to guide the communication connection destination in a manner that the face enters the display range.

(9)

The information processing device according to (3), in which in a case where the decided display range includes a portion lacking in image information, the control unit complements an image of the lacking portion.

(10)

An information processing method including, by a processor:

transmitting and receiving an image to and from a communication connection destination; and controlling a display range and a position of the image, on the basis of a display size and installation position information of a display device that displays the image, and distance information of a subject appearing in the image that is acquired from the image.

(11)

A program causing a computer to function as:

a communication unit configured to transmit and receive an image to and from a communication connection destination; and a control unit configured to control a display range and a position of the image, on the basis of a display size and installation position information of a display device that displays the image, and distance information of a subject appearing in the image that is acquired from the image.

REFERENCE SIGNS LIST 1 communication system
10 information processing device
11 control unit
12 camera
13 microphone
14 communication unit
15 display
16 speaker
17 storage unit
20 network
30 processing server

The invention claimed is:

1. An information processing device, comprising:

communication circuitry configured to transmit and receive an image to and from a communication connection destination; and control circuitry configured to:

estimate a distance between a camera and a subject that appears in the image, wherein the estimated distance is based on a relationship between a size of a face of the subject and at least one of an age or a sex of the subject, and the camera is associated with the communication connection destination;

calculate an actual height from a ground to the face of the subject based on spec information of the camera and the estimated distance from the camera to the subject, wherein the spec information includes first angle-of-view information of the camera in a direction horizontal to the ground and second angle-of-view information of the camera in a direction perpendicular to the ground; and control a display range of the image and a position of the image based on installation position information of a display device that displays the image, a display size of the display device, the calculated actual height, and the estimated distance of the subject.

2. The information processing device according to claim 1, wherein the installation position information includes height information of the display device from the ground, the control circuitry is further configured to
control execution of a life-size display of the subject based on a standing position of the subject, and
the standing position is a same position as a position of the display device.

3. The information processing device according to claim 2, wherein
the control circuitry is further configured to determine the display range of the image based on the standing position of the subject and the face of the subject,
the face of the subject is at the actual height, and
the standing position is the same position as the position of the display device.

4. The information processing device according to claim 2, wherein the control circuitry is further configured to estimate the distance based on the size of the face and the age of the subject.

5. The information processing device according to claim 4, wherein the distance between the camera and the subject is based on at least one of the age or the sex of the subject.

6. The information processing device according to claim 3, wherein based on the face is outside the determined display range, the control circuitry is further configured to notify the communication connection destination that the face of the subject is outside the determined display range.

7. The information processing device according to claim 6, wherein
the control circuitry is further configured to output the notification to guide the communication connection destination in a manner that the face enters the determined display range.

8. The information processing device according to claim 3, wherein based on the determined display range includes a portion that lacks in image information, the control circuitry is further configured to control complement of the image information of the portion.

9. An information processing method, comprising:
transmitting and receiving an image to and from a communication connection destination;
estimating a distance between a camera and a subject that appears in the image, wherein
the estimated distance is based on a relationship between a size of a face of the subject and at least one of an age or a sex of the subject, and
the camera is associated with the communication connection destination;
calculating an actual height from a ground to the face of the subject based on spec information of the camera and the estimated distance from the camera to the subject, wherein the spec information includes first angle-of-view information of the camera in a direction horizontal to the ground and second angle-of-view information of the camera in a direction perpendicular to the ground; and
controlling a display range of the image and a position of the image based on installation position information of a display device that displays the image, a display size of the display device, the calculated actual height, and the estimated distance of the subject.

10. A non-transitory computer-readable medium having stored thereon, computer-executable instructions which, when executed by a processor, cause the processor to execute operations, the operations comprising:
transmitting and receiving an image to and from a communication connection destination;
estimating a distance between a camera and a subject that appears in the image, wherein
the estimated distance is based on a relationship between a size of a face of the subject and at least one of an age or a sex of the subject, and
the camera is associated with the communication connection destination;
calculating an actual height from a ground to the face of the subject based on spec information of the camera and the estimated distance from the camera to the subject, wherein the spec information includes first angle-of-view information of the camera in a direction horizontal to the ground and second angle-of-view information of the camera in a direction perpendicular to the ground; and
controlling a display range of the image and a position of the image based on installation position information of a display device that displays the image, a display size of the display device, the calculated actual height, and the estimated distance of the subject.

11. The information processing device according to claim 1, wherein the spec information further includes a first number of pixels of the image in a direction horizontal to the ground and a second number of pixels of the image in a direction perpendicular to the ground.

* * * * *